US007787151B2

(12) United States Patent
Yoshida

(10) Patent No.: US 7,787,151 B2
(45) Date of Patent: Aug. 31, 2010

(54) TONE SETTING FOR MONOCHROME IMAGE USING INK COLOR DIAGRAM

(75) Inventor: Seishin Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 840 days.

(21) Appl. No.: 10/566,111

(22) PCT Filed: Jul. 21, 2004

(86) PCT No.: PCT/JP2004/010693

§ 371 (c)(1),
(2), (4) Date: Jan. 19, 2006

(87) PCT Pub. No.: WO2005/009027

PCT Pub. Date: Jan. 27, 2005

(65) Prior Publication Data

US 2008/0055679 A1    Mar. 6, 2008

(30) Foreign Application Priority Data

Jul. 22, 2003  (JP)  ............................. 2003-199688
Sep. 22, 2003  (JP)  ............................. 2003-329889

(51) Int. Cl.
*H04N 1/407* (2006.01)
(52) U.S. Cl. ..................... 358/3.23; 358/1.9; 382/302; 345/591; 345/594
(58) Field of Classification Search .................. 358/1.9, 358/3.23; 382/165, 267, 302; 345/594, 591, 345/593
See application file for complete search history.

(56) References Cited

U.S. PATENT DOCUMENTS 5,012,299 A * 4/1991 Sawamura et al. ............ 399/81

5,297,058 A * 3/1994 Samworth ................. 382/167

(Continued)

FOREIGN PATENT DOCUMENTS

EP        0 441 305        8/1991

(Continued)

OTHER PUBLICATIONS

Eni Oken et al, Color Schemes, 1999, Can You Imagine Software, Inc.*

(Continued)

*Primary Examiner*—King Y Poon
*Assistant Examiner*—Jamares Washington
(74) *Attorney, Agent, or Firm*—Martine Penilla & Gencarella, LLP

(57) ABSTRACT

A color tone setting window 100 that includes an ink color circle 110 is displayed in order to set a color tone of a monochrome image. By specifying a point Pcc in the ink color circle 110, intensities of color components representing three chromatic primary color inks are specified. The color component intensities representing three chromatic primary color inks are determined as parameters defining the color tone of the monochrome image in accordance with the position of the specified point Pcc in the ink color circle 110. The ink color circle 110 is configured such that the color component intensities representing three chromatic primary color inks can be visually recognized from the position in the ink color circle 110. Alternatively, ink color sliders can be used in lieu of the ink color circle 110.

16 Claims, 20 Drawing Sheets

U.S. PATENT DOCUMENTS

| | | | | |
|---|---|---|---|---|
| 5,317,678 | A | * | 5/1994 | Okawara et al. ............ 345/426 |
| 5,860,518 | A | * | 1/1999 | Axelrod ...................... 206/224 |
| 5,903,255 | A | | 5/1999 | Busch et al. |
| 5,930,009 | A | | 7/1999 | Sato et al. |
| 2003/0038870 | A1 | * | 2/2003 | Shimada .................... 347/100 |

FOREIGN PATENT DOCUMENTS

| | | |
|---|---|---|
| EP | 0 643 529 | 3/1995 |
| EP | 0 794 658 | 9/1997 |
| JP | 09-097319 | 4/1997 |
| JP | 09-298673 | 11/1997 |
| JP | 10-285414 | 10/1998 |
| JP | 11-196285 | 7/1999 |
| JP | 11-355584 | 12/1999 |
| JP | 2000-013628 | 1/2000 |
| JP | 2000-151985 | 5/2000 |
| JP | 2001-331164 | 11/2001 |
| JP | 2002-059571 | 2/2002 |
| JP | 2002-209084 | 7/2002 |

OTHER PUBLICATIONS

Gabor Horvath et al, Does reflection polarization by plants influence colour perception in insects?, Aug. 6, 2002, The Journal of Experimental Biology 205, pp. 3281-3298.*

Abstract of Japanese Patent Publication No. 09-097319, Pub. Date: Apr. 8, 1997, Patent Abstracts of Japan.

Abstract of Japanese Patent Publication No. 2002-059571, Pub. Date: Feb. 26, 2002, Patent Abstracts of Japan.

Abstract of Japanese Patent Publication No. 2001-076126, Pub. Date: Mar. 23, 2001, Patent Abstracts of Japan.

Abstract of Japanese Patent Publication No. 09-298673, Pub. Date: Nov. 18, 1997, Patent Abstracts of Japan.

Abstract of Japanese Patent Publication No. 10-285414, Pub. Date: Oct. 23, 1998, Patent Abstracts of Japan.

Abstract of Japanese Patent Publication No. 11-196285, Pub. Date: Jul. 21, 1999, Patent Abstracts of Japan.

Abstract of Japanese Patent Publication No. 11-355584, Pub. Date: Dec. 24, 1999, Patent Abstracts of Japan.

Abstract of Japanese Patent Publication No. 2000-013628, Pub. Date: Jan. 14, 2000, Patent Abstracts of Japan.

Abstract of Japanese Patent Publication No. 2000-151985, Pub. Date: May 30, 2000, Patent Abstracts of Japan.

Abstract of Japanese Patent Publication No. 2001-331164, Pub. Date: Nov. 30, 2001, Patent Abstracts of Japan.

Abstract of Japanese Patent Publication No. 2002-209084, Pub. Date: Jul. 26, 2002, Patent Abstracts of Japan.

* cited by examiner

Image to be printed

Color tone setting

Reference one-dimensional LUT 412

Monochrome image printing-use one-dimensional LUT 413

$C' = C \times (Cv/Cmax)$
$M' = M \times (Mv/Mmax)$
$Y' = Y \times (Yv/Ymax)$

Monochrome image printing

Color component intensity values Ic, Im, Iy for a point Pt corresponding to an arbitrary point Pcc in ink color circle:

$$Ic = \frac{Qc}{Qc + Qm + Qy}$$

$$Im = \frac{Qm}{Qc + Qm + Qy}$$

$$Iy = \frac{Qy}{Qc + Qm + Qy}$$

$$Qc = \overline{PtPc}, \quad Qm = \overline{PtPm}, \quad Qy = \overline{PtPy}$$

Relationship between color component intensity value Ic and tone adjustment value Cv Linear conversion Non-linear conversion Color circle display Permissible / Non-permissible Color slider display Color component intensity values Ic, Im, Iy for an arbitrary point Pcc (=Pt) in ink color circle $$Ic = \frac{Qc}{2R}$$

$$Im = \frac{Qm}{2R}$$

$$Iy = \frac{Qy}{2R}$$

$Qc = \overline{PtPc}$, $Qm = \overline{PtPm}$, $Qy = \overline{PtPy}$

Reference one-dimensional LUT 412a (eight ink colors)

Monochrome image printing-use one-dimensional LUT 413a (eight ink colors)

$$C' = C \times (Cv/Cmax)$$
$$LC' = LC \times (Cv/Cmax)$$
$$M' = M \times (Mv/Mmax)$$
$$LM' = LM \times (Mv/Mmax)$$
$$Y' = Y \times (Yv/Ymax)$$

Reference one-dimensional LUT 412 (six ink colors)

Monochrome image printing-use one-dimensional LUT 413A (eight ink colors)

$$C' = \alpha C \times (Cv/Cmax)$$
$$LC' = k1(1-\alpha) C \times (Cv/Cmax)$$
$$M' = \beta M \times (Mv/Mmax)$$
$$LM' = k2(1-\beta) M \times (Mv/Mmax)$$
$$Y' = Y \times (Yv/Ymax)$$

Neutral

Cool

TONE SETTING FOR MONOCHROME IMAGE USING INK COLOR DIAGRAM

TECHNICAL FIELD

This invention relates to a technology for setting a color tone of a monochrome image.

BACKGROUND ART

FIG. 16 is a block diagram showing in a conceptual fashion a technology to print color images using a color printer. A scanner 20 outputs to a computer 10 image data DT2 indicating a read image. The computer 10 displays the image on the CRT 22 based on the image data DT2 and causes the color printer 30 to print the image. Where it is desired to print the read image in color, R, G and B signals (hereinafter collectively termed 'RGB signals') indicating the amounts of red, green and blue in the image are used as the image data DT2.

In the computer 10, an application program 40 is run under the control of a prescribed operating system. CRT driver software 17 and printer driver software 41 are incorporated in this operating system. Image data DT1 to be relayed to the color printer 30 is output from the application program 40 via the printer driver software 41.

The application program 40 comprises photo editing software, for example, that performs image editing (retouching) of the image data DT2. The processing result DT3 obtained via the application program 40 is supplied to the CRT driver software 17 or the printer driver software 41.

When a print command is issued by the application program 40, the printer driver software 41 of the computer 10 converts the processing result DT3 into printing signals DT1 and sends them to the color printer 30. The color printer 30 contains various colors of ink, and the printing signals DT1 contain information regarding data indicating the dot formation status for multiple colors of ink (dot data) and regarding the amount of sub-scanning to be performed.

The printer driver software 41 incorporates a resolution conversion module 41a, a color conversion module 41b, a halftone module 41c, a rasterizer 41d and a color conversion module 41e.

The resolution conversion module 41a converts the resolution of the processing result DT3 obtained from the application program 40 into a printing resolution in order to obtain a conversion result DT4. The conversion result DT4 naturally include color information. Based on the conversion result DT4, the color conversion module 41b uses the color conversion table 41e to determine the amount of each color of ink to be used by the color printer 30 for each pixel. The halftone module 41c performs so-called halftone processing. The rasterizer 41d arranges the dot data in the order of the data to be relayed to the color printer 30 and outputs the printing signals DT1 to the color printer 30 as final print data.

This technology has been introduced in Patent Document 1 (JP 2002-59571A), for example. Furthermore, a technology to print multiple images corresponding to multiple colors using a color printer has been introduced in Patent Document 2 (JP H11-196285A), for example.

The above technologies for displaying color images on a printing medium are widely used. However, monochrome images having a single color hue (also termed 'monotone images') exhibit a particular 'feel' when they have a prescribed color tone, and there is a strong demand for printing of monochrome images. The conventional technology shown in FIG. 16 can also print monochrome images.

For example, an image read by the scanner 20 is caused to be recognized by the computer 10 as an achromatic grey image. Because all pixels of a grey image have the same amounts of red, green and blue, the R, G and B signals of the image data DT2 all have the same value.

The application program 40 performs processing to assign a prescribed color tone to the grey image expressed by the image data DT2 (hereinafter termed 'color tone assignment processing') and generates a processing result DT3.

FIGS. 17 and 18 are graphs representing the conversion of RGB signals in accordance with the color tone assignment processing, and shows new R, G and B signals included in the processing result DT3 obtained via the color tone assignment processing as R', G' and B' signals (hereinafter collectively termed R'G'B' signals). The R, G and B signals of the image data DT2 all have equal values. Here, a situation is described in which the tone values of the RGB signals comprise 256 steps corresponding to the integers 0-255.

FIG. 17 shows a case in which it is desired to print a grey image as a grey image (hereinafter 'neutral tone'); FIG. 18 shows a case in which it is desired to print the grey image as having a cool color tendency (hereinafter 'cool tone'); FIG. 19 shows a case in which it is desired to print the grey image as having a warm color tendency (hereinafter 'warm tone'); and FIG. 20 shows a case in which it is desired to print the grey image as a faded color image (hereinafter 'sepia tone').

The R'G'B' signals obtained in this fashion undergo resolution conversion via the resolution conversion module 41a, whereupon they are converted to amounts of various inks to be used by the color printer 30 using the color conversion table 41e in the color conversion module 41b. The values of the R'G'B' signals are maintained even after resolution conversion by the resolution conversion module 41a.

FIG. 21 is a graph describing the technology by which the amounts of C, M, Y and K ink representing the colors of cyan, magenta, yellow and black to be used are set based on the R'G'B' signals using the color conversion table 41e. Because the R', G' and B' signals are mutually independent, the color conversion table 41e is expressed schematically as a three-dimensional cube. Here, a situation is shown in which the tone values comprise the 256(=$2^8$) levels of 0-255. In order to limit the required memory capacity, it is not preferred that the color conversion table 41e store $2^8 \times 2^8 \times 2^8$ (approximately 16.78 million) sets of data. Therefore, the data storage positions in the color conversion table 41e are set in a discrete fashion as lattice points, one for every 17 tone values, for example. Here, one data set includes three types of data representing ink amounts for C, M and Y, for example. FIG. 21 shows a position $T_0$ corresponding to the values r0, g0, b0 for the R', G' and B' signals, respectively.

However, in general, it can occur that a lattice point corresponding to given values r0, g0, b0 does not exist. In such a case, multiple lattice points surrounding the position $T_0$ are generally selected and the ink amounts corresponding to the position $T_0$ are determined via interpolation using the ink amounts stored for the selected lattice points.

In the above configuration, it is not easy to set a color tone of a monochrome image to a desired color tone. 256 types of RGB signals are sufficient to express the image data DT2 representing a grey image. However, because the R', G' and B' signals expressing a monochrome image have mutually different values, printing of a monochrome image will need the same type of color conversion processing which is performed for a color image. Furthermore, the time required for such processing increases dramatically due to the trial and error operations required to set the color tone of the monochrome image.

DISCLOSURE OF THE INVENTION

The present invention was devised in order to address the above issues, and a main object thereof is to provide a technology to enable a color tone of a monochrome image to be easily set.

In order to achieve the above object, a first method according to the present invention is a method for setting a color tone of a monochrome image, comprising the steps of: (a) displaying a color tone setting window for use in setting a color tone of a monochrome image, the color tone setting window including an ink color circle for specifying color component intensities representing three chromatic primary color inks with a single specified point therein; and (b) determining the color component intensities representing the three chromatic primary color inks as parameters defining the color tone of the monochrome image in accordance with the position of a point specified in the ink color circle, wherein the ink color circle is configured to enable the color component intensities representing the three chromatic primary color inks to be visually recognized from the position in the ink color circle.

According to this method, the user can set the color tone of the monochrome image by specifying a single point in the ink color circle. In addition, because the ink color circle is configured such that the color component intensities representing three chromatic primary color inks can be visually recognized from a position in the ink color circle, the color tone of the monochrome image can be easily set.

The three chromatic primary color inks may be cyan ink, magenta ink and yellow ink, which constitute output of a one-dimensional lookup table that is used for color conversion during printing of a monochrome image to obtain output of ink amounts for the plural ink colors in response to input of a lightness tone value of an image.

According to this arrangement, because a position in the ink color circle corresponds to the intensities of cyan, magenta and yellow ink, it is easy to visually recognize the color tone of the monochrome image.

It is acceptable that an arbitrary point in the ink color circle is mapped to a corresponding point in an ink color triangle which is a hypothetical equilateral triangle corresponding to the ink color circle, and the ink color triangle is an equilateral triangle having a common center with the ink color circle such that the color component intensities representing the three chromatic primary color inks at the corresponding point are determined in accordance with lengths of three lines drawn perpendicularly to three sides of the ink color triangle respectively from the corresponding point.

According to this arrangement, because the color component intensities representing three chromatic primary color inks are determined from the position of the point specified in the ink color circle, the color tone of the monochrome image is readily determined accordingly.

The corresponding point in the ink color triangle corresponding to an arbitrary point in the ink color circle may be mapped such that the corresponding point is present on a straight line connecting the center of the ink color circle and the arbitrary point.

According to this arrangement, the position of an arbitrary point in the ink color circle can be easily converted to the position of the corresponding point in the ink color triangle.

It is acceptable if a corresponding point in the ink color triangle corresponding to an arbitrary point on outer circumference of the ink color circle is mapped such that the corresponding point is present on a side of the ink color triangle.

According to this arrangement, all positions in the ink color circle can be effectively used.

The center of the ink color circle may express an achromatic color, and the mapping may have a non-linear conversion characteristic wherein change in the color component intensities representing the three chromatic primary color inks corresponding to change in position of a point decreases as the point becomes closer to the center of the ink color circle.

In general, small changes in color tone tend to easily become conspicuous in the proximity of the achromatic color region. Therefore, according to the above arrangement, the relationship between the amount of change in the position of a point in the ink color circle and the amount of change in the appearance of the color tone can be nearly harmonized throughout the ink color circle.

The color tone setting window may further include a sample image display area for displaying a monochrome sample image, and the step (b) may include a step of adjusting the color tone of the monochrome sample image based on the color component intensities representing the three chromatic primary color inks that are set using the ink color circle.

According to this arrangement, it can be easily determined onscreen whether or not the color tone of the monochrome image is appropriate.

The color tone setting window may be able to display the ink color circle and color sliders.

According to this arrangement, the color tone of the monochrome image can be set using one of either of two types of tone setting means based on user preference.

The color sliders may include three ink color sliders used to set the color component intensities representing the three chromatic primary color inks.

According to this arrangement, the monochrome image tone to be set can be recognized in a more visual fashion.

The color tone setting window may include a first window that has the ink color circle and a second window that has the color sliders such that the first and second windows are switched to be selectively displayed according to user selection.

According to this arrangement, because the two color setting windows are switched and only one is displayed, the screen can be prevented from becoming too complicated and tone setting can be performed with only the window that the user finds easier to use being displayed.

When the first window is switched to the second window according to user selection, the color tone specified via a specified point in the ink color circle may be reflected and displayed on the color sliders.

According to this arrangement, the color tone set via the ink color circle can be confirmed using the color sliders.

On the other hand, when the user instructs that the second window be switched to the first window, switching to the first window may be prohibited and display of the second screen is maintained, or a warning display may be issued indicating that the attempted switch to the first window is invalid.

According to these arrangement, even where the color tone set on the second screen cannot be reflected on the first window, the user can be prompted to proceed appropriately.

The color tone setting window may have buttons to set multiple basic color tones, such that when a user selects one basic color tone, the specified point in the ink color circle and slider positions of the color sliders are displayed at a position indicating the selected basic tone.

According to this arrangement, a representative basic tone can be easily set.

The above method may further comprising the steps of: (c) providing a reference one-dimensional lookup table that inputs an image lightness tone value and outputs ink amounts for plural types of ink including multiple chromatic inks; and (d) generating a printing-use one-dimensional lookup table for use in printing of a monochrome image by adjusting amounts of the multiple chromatic inks in the reference one-dimensional lookup table in accordance with the color component intensities representing the three chromatic primary color inks determined in the step (b).

According to this arrangement, a printing-use one-dimensional lookup table for use in reproducing a set color tone can be easily created. Furthermore, if this printing-use one-dimensional lookup table is used, a monochrome image to which the set color tone is assigned can be easily printed.

Where multiple inks having different concentrations of identical color components are usable, the ink amounts of the multiple different-concentration inks may be adjusted using an identical color component intensity value.

According to this arrangement, even where inks of different concentrations can be used, their ink amounts can be easily adjusted.

The above method may further comprises the steps of determining an ink amount adjustment value for each color component based on the intensity value for each color component; and adjusting an ink amount for each color component using the ink amount adjustment value for each color component, wherein relationship between the intensity value of each color component and the ink amount adjustment value for each color component is established independently for each color component.

According to this arrangement, the relationship between the position of a specified point in the ink color circle and the post-adjustment color tone can be set in advance to any given desired relationship.

A second method pertaining to the present invention is a method for setting a color tone of a monochrome image, comprising the steps of: (a) displaying a color tone setting window for use in setting a color tone of a monochrome image, the color tone setting window including an ink color triangle for specifying color component intensities representing three chromatic primary color inks with a single specified point therein; and (b) determining the color component intensities representing the three chromatic primary color inks as parameters defining the color tone of the monochrome image in accordance with the position of a point specified in the ink color triangle, wherein the ink color triangle is configured to enable the color component intensities representing the three chromatic primary color inks to be visually recognized from the position in the ink color triangle.

According to this method, the user can set a color tone of a monochrome image by specifying a single point in the ink color triangle. Because the ink color triangle is configured such that the color component intensities representing three chromatic primary color inks can be visually recognized from a position in the ink color triangle, the color tone of the monochrome image can be easily set.

The present invention can be realized in various forms, and may be realized as, for example, a tone setting method and apparatus, a tone setting assistance method and apparatus, a printing control method and apparatus, a printing method and apparatus, a computer program by which to realize the functions of any of these methods and apparatuses, or a recording medium on which such computer program is recorded.

BEST MODE FOR CARRYING OUT THE INVENTION

Figure 1:
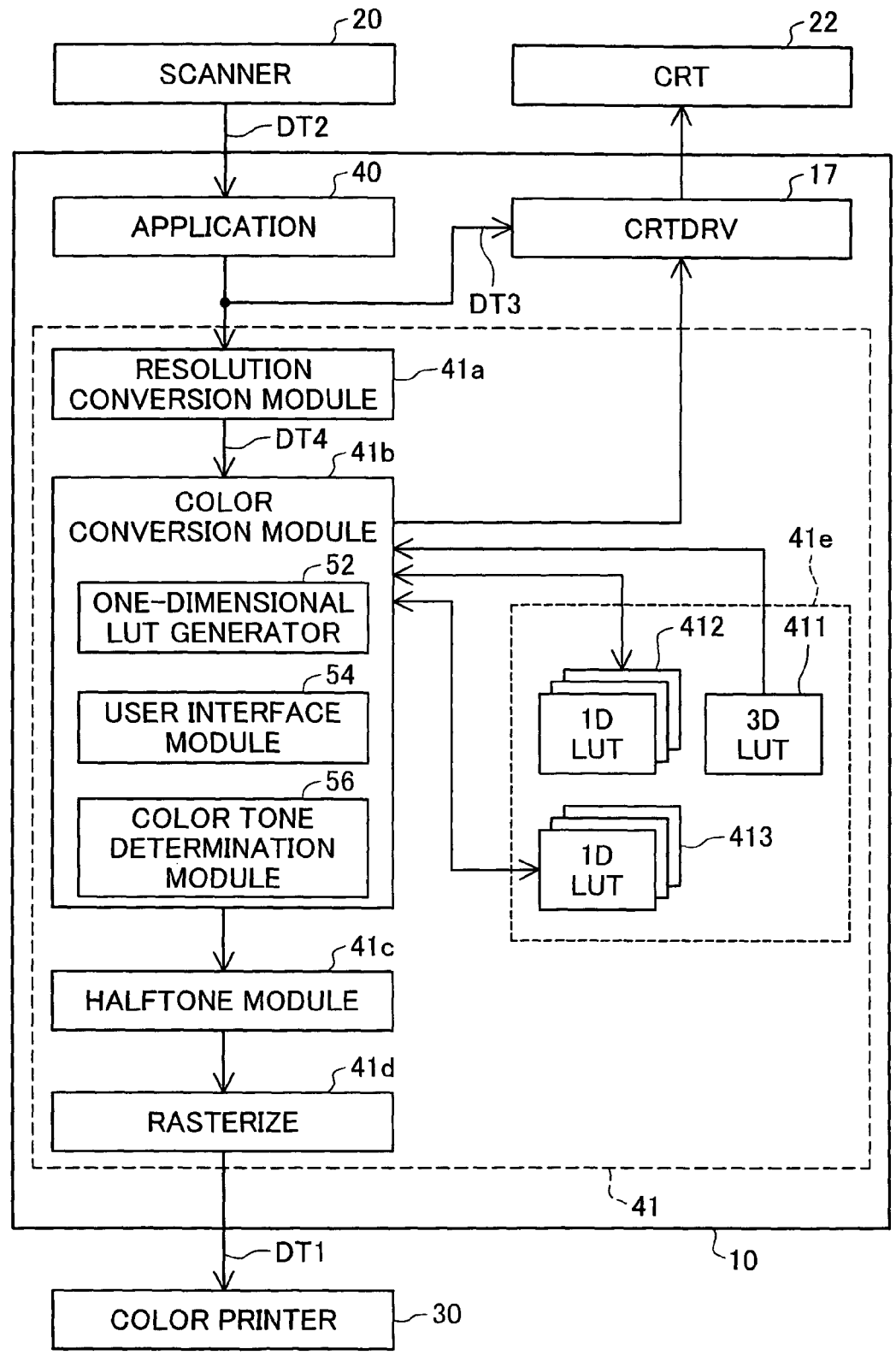
FIG. 1 is a block diagram showing a first embodiment of the present invention in a conceptual fashion.

Embodiments of the present invention are described below according to the following sequence:
A. First embodiment
B. Second embodiment
C. Third embodiment D. Fourth embodiment
E. Variations A. First Embodiment FIG. 1 is a block diagram showing in a conceptual fashion a technology for printing monochrome images using a color printer pertaining to a first embodiment of the present invention. This technology differs from the configuration shown in FIG. 11 in regard to the construction of the color conversion table 41e and the functions of the color conversion module 41b. The color conversion module 41b has a one-dimensional lookup table generator 52 that generates a one-dimensional lookup table used for printing of a monochrome image, a user interface module 54 that displays a color tone setting window on a display device (CRT 22), and a color tone setting module 56 that determines the tone of the monochrome image based on the settings in the color tone setting window. The functions of the color conversion module 41b are described in detail below.

The grey image whose color tone is to be assigned by the color conversion module 41b may be a grey image read by a scanner 20, for example. If a image read by the scanner 20 is a color image, such image may be converted to a grey image via photo editing using an application program 40. Even where the original image is a color image, it is converted to a grey image, and it is used to produce a monochrome image to which a tone is subsequently assigned.

The color conversion table 41e includes a three-dimensional lookup table (LUT) 411 used for color image printing and one-dimensional lookup tables 412, 413 for use in monochrome image printing.

Figure 2:
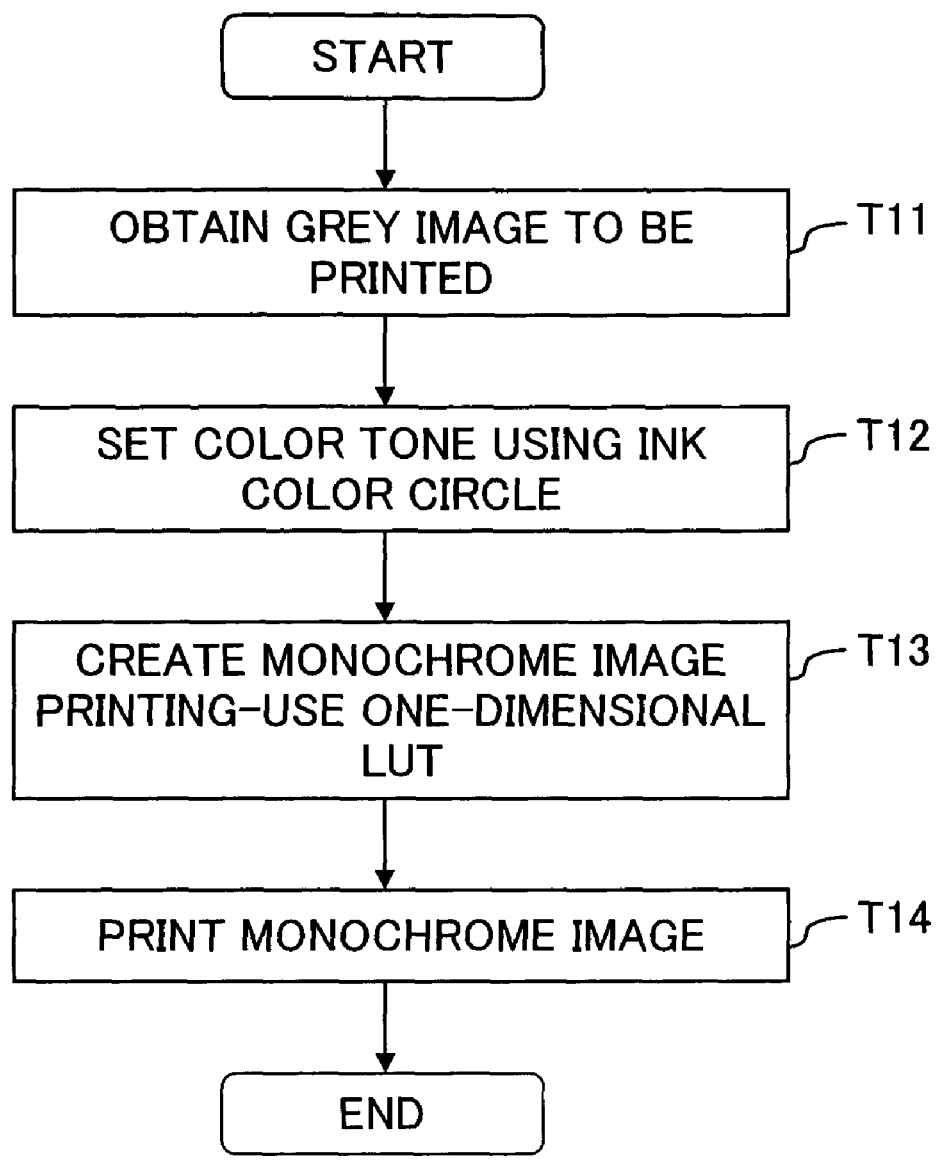
FIG. 2 is a flow chart showing the entire sequence of operations executed in order to print a monochrome image in the first embodiment.

FIG. 2 is a flow chart showing the entire sequence of operations executed to print a monochrome image in the first embodiment. FIGS. 3A through 3E are explanatory drawings showing the entire sequence of processes executed in the first embodiment. In step T11 in FIG. 2, grey image data (see FIG. 3A) to be printed is generated by the application program 40. Alternatively, this process may be implemented by a grey image generator (not shown) incorporated in the printer driver 41.

In step T12, a color tone setting window 10 is displayed on the CRT 22 by the user interface module 54, and the user sets the monochrome image tone using the ink color circle 110 in the color tone setting window 100. This tone setting method using the ink color circle 110 is described below. When the tone is set, the one-dimensional LUT generator 52 generates a printing-use one-dimensional lookup table 413 (see FIG. 3D) from the reference one-dimensional lookup table 412 (see FIG. 3C).

Figure 4:
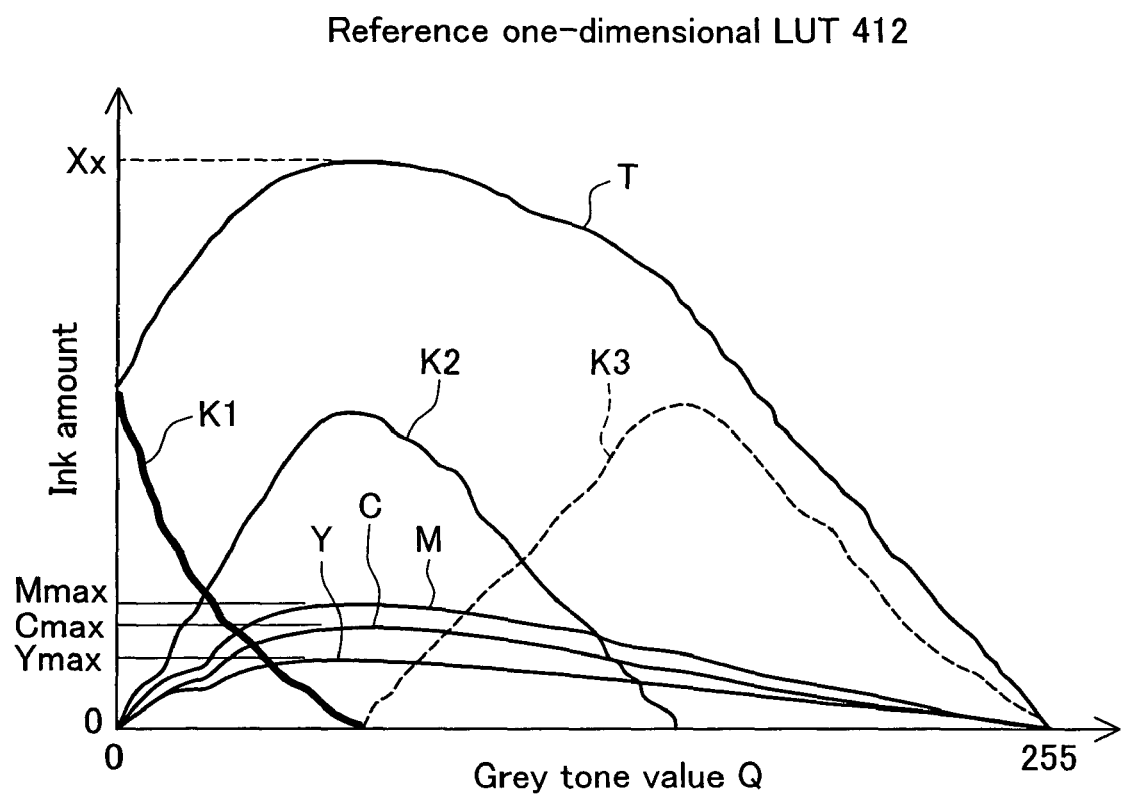
FIG. 4 is a graph showing in a schematic fashion the ink amounts in the reference one-dimensional LUT 412.

FIG. 4 is a graph showing the contents of the reference one-dimensional 412 in an expanded fashion. The reference one-dimensional LUT 412 in the first embodiment is an LUT used when printing of a neutral-tone grey image is performed. The horizontal axis represents the lightness tone value Q of the grey image (termed the 'grey tone value' or 'lightness tone value' below), while the vertical axis represents the ink amount for each ink color. The grey tone value Q increases in lightness as the value increases.

In the example shown in FIG. 4, three ink colors having different lightnesses are used as achromatic inks, and are expressed as ink amounts K1, K2, K3 in ascending order of brightness. In addition, the three colors of cyan, magenta and yellow are used as chromatic inks, and are expressed as ink amounts C, M, Y. If the ink amounts K1, K2, K3, C, M, Y stored in the reference one-dimensional LUT 412 are used for a grey tone value Q, a neutral-tone image will be printed.

Incidentally, the term 'one-dimensional LUT' indicates that input is one-dimensional (a grey tone value only). The output of the one-dimensional LUT comprises multiple values expressing the ink amounts for the multiple types of ink used during monochrome printing.

The one-dimensional LUT generator 52 (see FIG. 1) generates a monochrome image printing-use one-dimensional LUT 413 representing a color tone that may be set using the ink color circle 110. Here, 'color tone' or 'tint' is a combination of 'hue' and 'saturation'. The monochrome image printing-use one-dimensional LUT 413 shown in FIG. 3D has the same achromatic ink amounts K1, K2, K3 as the reference one-dimensional LUT 412, but at least one of the chromatic color ink amounts C', M', Y' is different from the amount for the corresponding color in the reference one-dimensional LUT 412. In other words, the monochrome image printing-use one-dimensional LUT 413 is generated by adjusting the chromatic ink amounts C, M, Y in the reference one-dimensional LUT 412.

The chromatic ink amounts C', M', Y' are determined according to the following equations (1a) through (1c), for example.

$$C'=C\times(Cv/C\max) \quad (1a)$$

$$M'=M\times(Mv/M\max) \quad (1b)$$

$$Y'=Y\times(Yv/Y\max) \quad (1c)$$

Here, Cmax, Mmax, Ymax are the maximum values for the respective chromatic ink amounts C, M, Y in the reference one-dimensional LUT 412 (see FIG. 4), and Cv, Mv, Yv are the adjustment values for the respective ink colors set using the ink color circle 110. The method for determining these adjustment values Cv, Mv, Yv is described below.

In step T14 in FIG. 2, the monochrome image is printed using the set color tone. During printing, the color conversion module 41b converts the image data for the grey image to be printed into multiple ink amounts using the printing-use one-dimensional LUT 413 created in step T13. The image data for the grey image to be printed is converted into ink amounts for multiple types of ink. Print data DT1 to be supplied to the printer 30 is then generated by the halftone module 41c and the rasterizer 41d.

Figure 5:
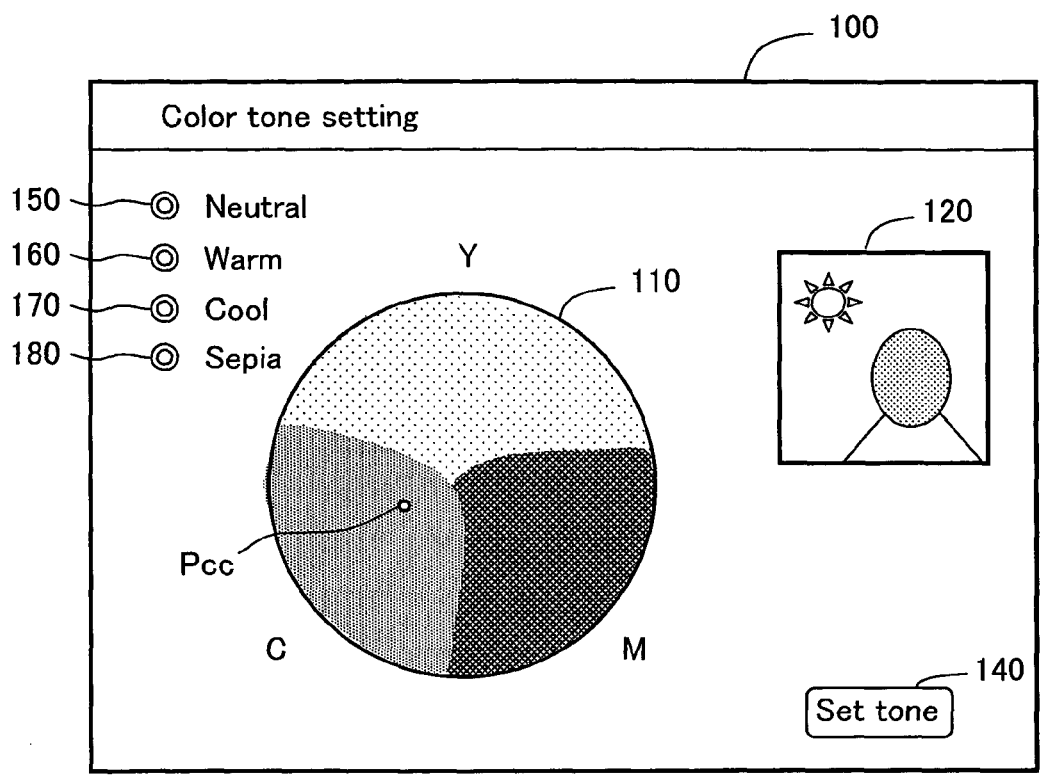
FIG. 5 is an explanatory drawing showing a color tone setting window 100 in an expanded fashion.

FIG. 5 is an explanatory drawing showing the color tone setting window 100 in an expanded fashion. This color tone setting window 100 has an ink color circle 110, a sample image display area 120, a tone determination button 140 and four reference tone setting buttons 150, 160, 170, 180. Each pixel in the ink color circle 110 is displayed using a preset color tone in accordance with its position in the ink color circle 110. The tone of the monochrome image is set in accordance with the position of an arbitrary point Pcc specified in the ink color circle 110. The sample image display area 120 is an area for display of a sample image the color tone of which is assigned in accordance with the specified point Pcc. This sample image is preferably a reduced image of the image to be printed (see FIG. 3A), but a prescribed reference image may be used as the sample image.

The reference tone setting buttons 150, 160, 170, 180 are used to obtain a monochrome image having reference color tones including a neutral tone, a warm tone, a cool tone, and a sepia tone. When one of these buttons is selected, a specific mark (such as a black dot) indicating the selected reference color tone is displayed in the ink color circle 110. When the tone determination button 140 is pressed after one of these four reference tone buttons is pressed, that reference color tone is used as is as the color tone of the monochrome image.

Where it is desired to readjust the color tone, however, a different position in the ink color circle 110 can be specified after a reference tone setting button is pressed. In this case, it is preferred that the position of the new specified point Pcc be indicated using a mark different from the mark used to indicate the reference color tone while leaving the reference tone mark in place. Alternatively, the reference tone mark may be deleted, leaving only the mark of the new specified point Pcc displayed. The color tone of the monochrome image can also be set by setting the position in the ink color circle 110 only without selecting a reference tone setting button. This color tone setting method using the reference tone setting buttons 150, 160, 170, 180 is also used in the other embodiments described below.

Figure 6:
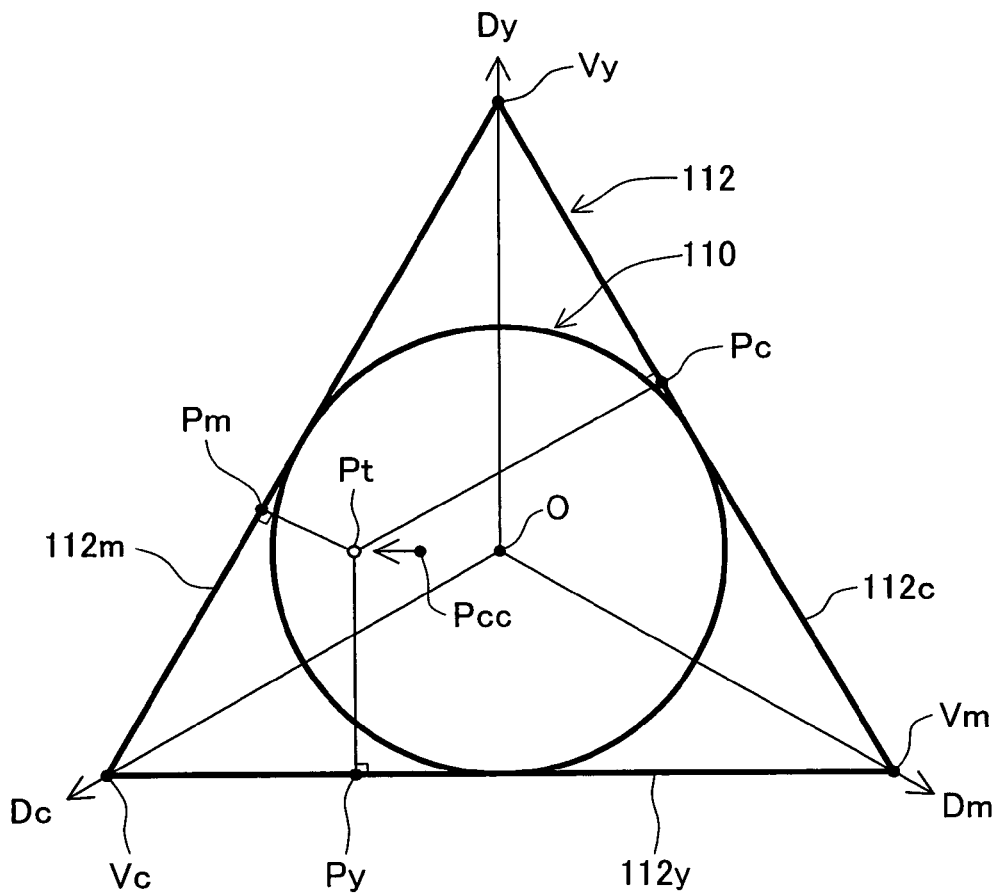
FIG. 6 is an explanatory drawing showing the method for determining the color component intensity values Ic, Im, Iy representing three chromatic primary color inks in accordance with a specified point Pcc in the ink color circle 110.

FIG. 6 is an explanatory drawing showing the method for determining the color component intensity values Ic, Im, Iy representing three chromatic primary color inks in accordance with the specified point Pcc in the ink color circle 110. The ink color circle 110 is related to the ink color triangle 112. In other words, a given specified point Pcc in the ink color circle 110 is mapped to a corresponding point Pt in the ink color triangle 112. The ink color triangle 112 is an equilateral triangle sharing a common center O with the ink color circle 110. The method for mapping the specified point Pcc to the corresponding point Pt will be described below.

The three vertices Vc, Vm, Vy of the ink color triangle 112 are associated with the three chromatic primary color inks, and the sides 112*c*, 112*m*, 112*y* opposite these vertices are also associated with the three chromatic primary color inks. More specifically, the direction Dy from the bottom side 112*y* toward the vertex Vy indicates the intensity of the yellow ink. Similarly, the direction Dc from the right side 112*c* toward the vertex Vc indicates the intensity of the cyan ink, and the direction Dm from the left side 112*m* toward the vertex Vm indicates the intensity of the magenta ink.

The color component intensity values Ic, Im, Iy representing three chromatic primary color inks for a given point Pt in the ink color triangle 112 are derived according to the following equations:

$$Ic = Qc/(Qc+Qm+Qy) \quad (2a)$$

$$Im = Qm/(Qc+Qm+Qy) \quad (2b)$$

$$Iy = Qy/(Qc+Qm+Qy) \quad (2c)$$

Here, Qc is the length of the line drawn perpendicularly to the side 112*c* from the point Pt, Qm is the length of the line drawn perpendicularly to the side 112*m* from the point Pt, and Qy is the length of the line drawn perpendicularly to the side 112*y* from the point Pt.

As defined by the above equations (2a) through (2c), the sum of the color component intensity values Ic, Im, Iy is always '1'. For example, where the point Pt is located at the center O, Ic=Im=Iy=⅓. Because the three color component intensity values Ic, Im, Iy are equal at the center O as described above, the center O can be understood to correspond to an achromatic color (neutral tone). At a position above the center O and close to the vertex Vy, the yellow color component intensity value increases. For example, when the point Pt is positioned at the vertex Vy, the yellow color component intensity value Iy is 1, while the other color component intensity values Im, Ic are zero. Similarly, at a position to the lower left of the center O and close to the vertex Vc, the cyan color component intensity value increases, and at a position to the lower right of the center O and close to the vertex Vm, the magenta color component intensity value increases. It is not necessary that the sum of the three color component intensity values Ic, Im, Iy equal '1', but it is preferred that the sum is always equal to a prescribed value. For example, if '−⅓' is added to the right side of the above equations (2a) through (2c), the sum of the three color component intensity values Ic, Im, Iy will be always equal to zero.

Figure 3A:
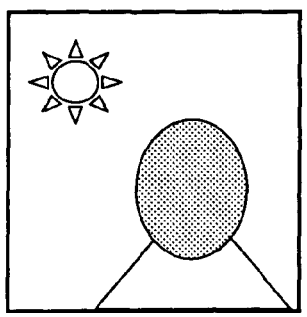
FIGS. 3A through 3E are explanatory drawings showing the entire sequence of processes executed in the first embodiment.
Figure 3B:
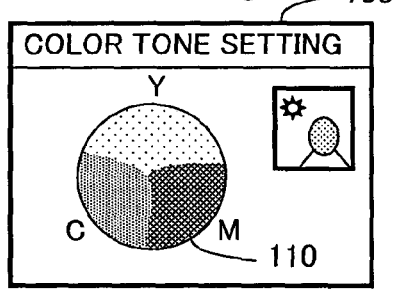
Figure 3C:
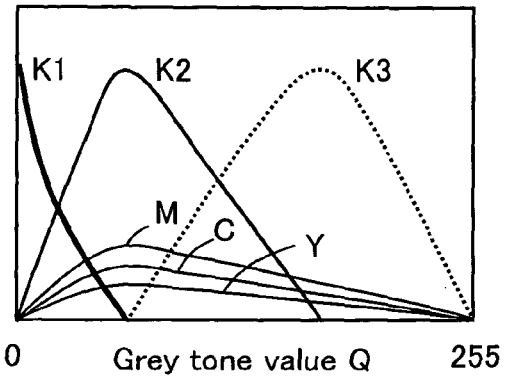
Figure 3D:
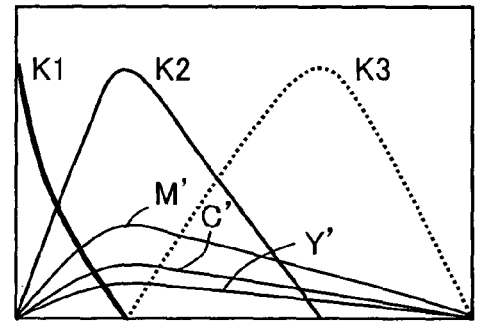
Figure 3E:
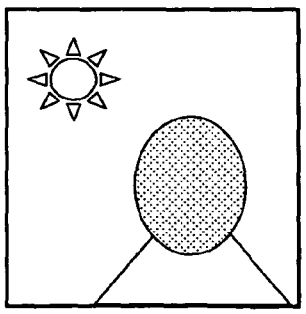
Figure 7A:
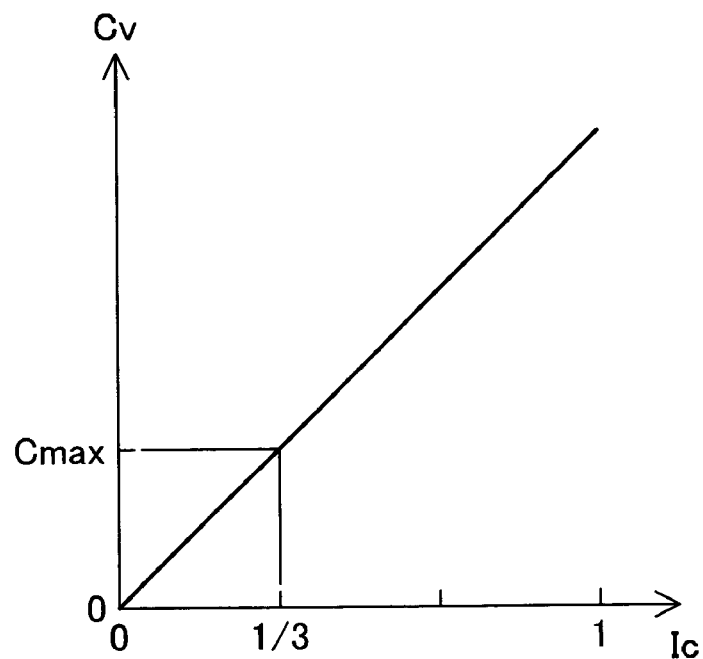
FIGS. 7A and 7B are graphs showing the relationship between the color component intensity value Ic and the tone adjustment value Cv.
Figure 7B:
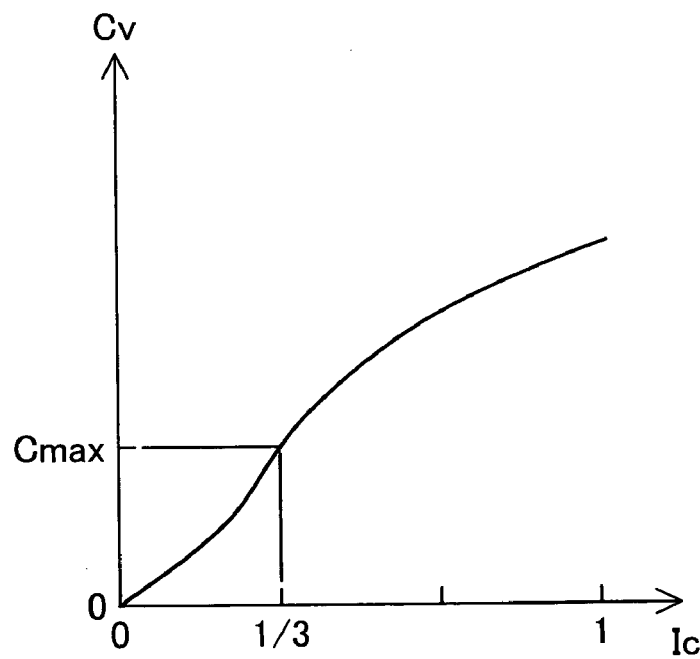

FIGS. 7A and 7B show the relationship between the cyan color component intensity value Ic and the tone adjustment value Cv (see FIG. 3D). In the example shown in FIG. 7A, the tone adjustment value Cv increases linearly as the color component intensity value Ic increases. In the example shown in FIG. 7B, the tone adjustment value Cv increases in a curved (non-linear) fashion as the color component intensity value Ic increases. In either case, when the color component intensity value Cv is ⅓, the tone adjustment value Cv equals the maximum value Cmax for the cyan ink amount in the reference one-dimensional LUT 412. In this case, when all of the three color component intensity values Ic, Im, Iy equal ⅓, a neutral-tone monochrome image will be reproduced. The same characteristic may be used for magenta and yellow as for cyan, or different characteristics may be used for different ink colors. In this way, the tone adjustment values Cv, Mv, Yv used when the printing-use one-dimensional LUT 413 is created are uniquely determined in accordance with the position of the arbitrary point Pt in the ink color triangle 112. The color component intensity values Ic, Im, Iy and the tone adjustment values Cv, Mv, Yv are all used as parameter values to control the color tone of the monochrome image.

Rather then having a preset relationship between the color component intensity values Ic, Im, Iy and the tone adjustment values Cv, Mv, Yv, it is acceptable if there is instead a preset relationship between the color component intensity values Ic, Im, Iy and the ink amount adjustment coefficients (Cv/Cmax), (Mv/Mmax) and (Yv/Ymax).

Figure 8:
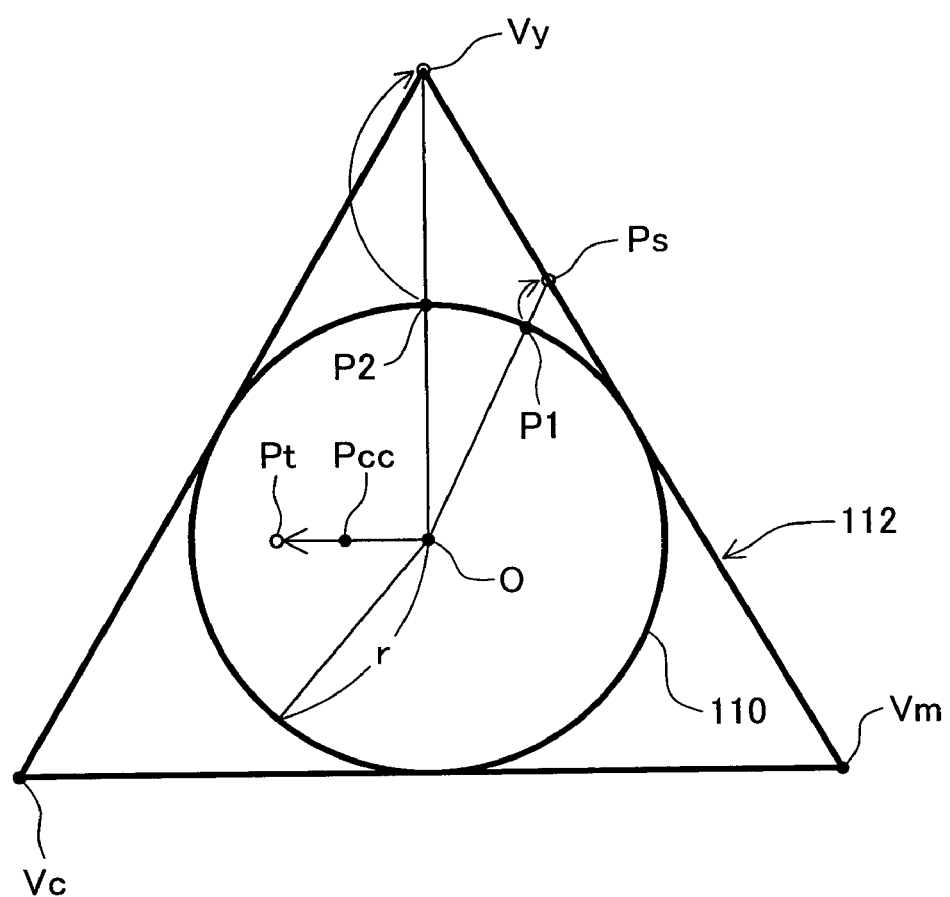
FIG. 8 is an explanatory drawing showing the positional relationship between a given point in the ink color circle 110 and the corresponding point thereto in the ink color triangle 112.

FIG. 8 is an explanatory drawing showing an example of the positional relationship between a given specified point Pcc in the ink color circle 110 and a corresponding point Pt in the ink color triangle 112. As shown in FIG. 8, the corresponding point Pt is set along the line connecting the center O and the specified point Pcc. In addition, the corresponding point Ps that corresponds to a given specified point P1 on the circumference of the ink color circle 110 is positioned at the point of intersection between the line connecting the center O and the specified point P1 and the side of the ink color triangle 112. In particular, the corresponding point of a specified point P2 that is located on the circumference of the ink color circle 110 and on the line connecting the center O and a vertex of the triangle is positioned at the vertex Vy of the ink color triangle 112. With this mapping, because a point in the ink color circle 110 and a point in the ink color triangle 112 are associated bi-directionally, the position of a point in the ink color circle 110 can be sought from the position of a point in the ink color triangle 112.

Figure 9A:
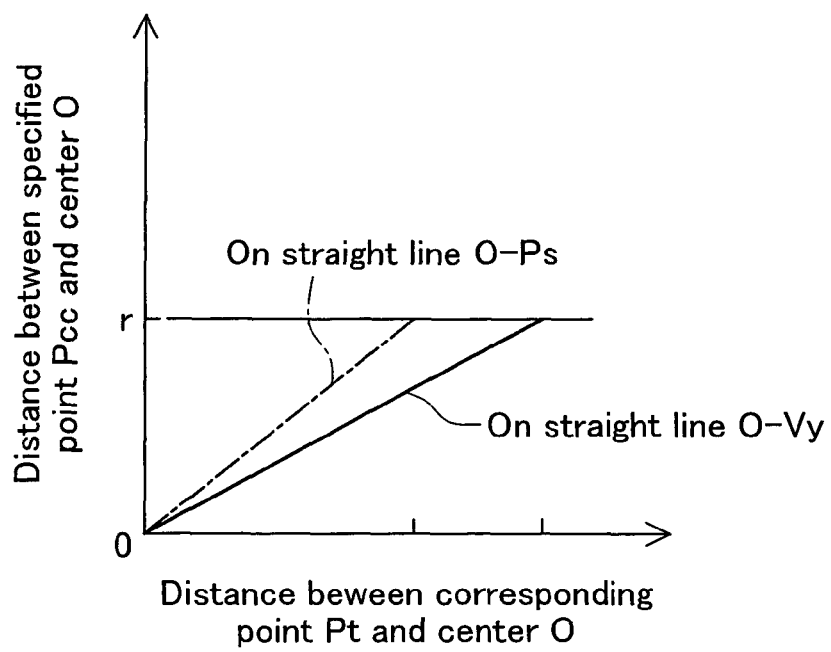
FIGS. 9A and 9B are graphs showing the conversion characteristic during mapping of a specified point and the corresponding point thereto.
Figure 9B:
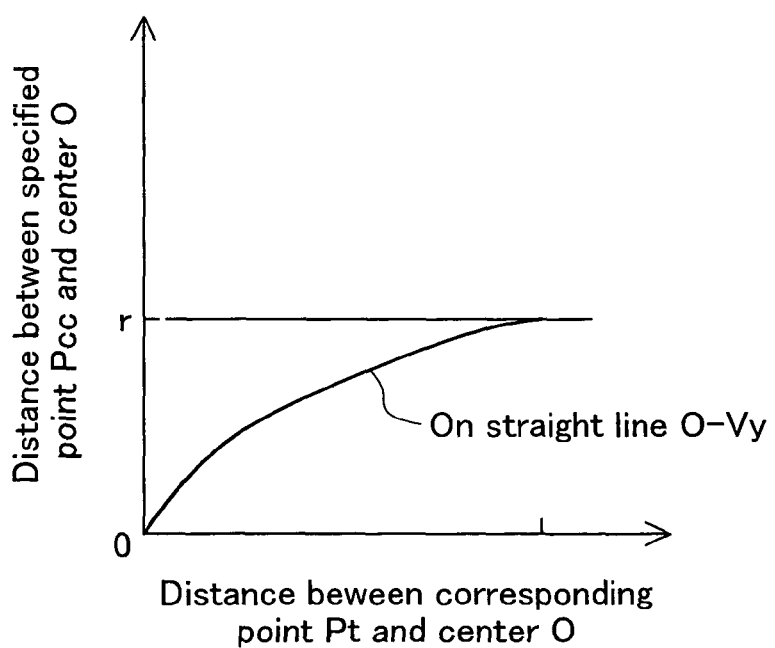

FIGS. 9A and 9B show examples of conversion characteristics during mapping of a specified point Pcc and the corresponding point Pt. FIG. 9A is an example of linear conversion. The vertical axis in FIG. 9A indicates the distance between the given specified point Pcc and the center O, while the horizontal axis indicates the distance between the corresponding point Pt and the center O. The solid line indicates the relationship along the straight line O-Vy in FIG. 8, while the broken line indicates the relationship along the straight line O-Ps. The value (r) on the vertical axis represents the radius of the ink color circle 110. From the two conversion characteristics shown in FIG. 9B, it can be seen that the distance from the center O is converted in a linear fashion. Moreover, the distance from the center O to the corresponding point Pt is larger than the distance from the center O to the specified point Pcc. Therefore, using this mapping, points in the ink color triangle 112 can be considered to be compressed into points in the ink color circle 110. The position of the corresponding point Pt in the ink color triangle 112 can be sought by converting the distance between the specified point Pcc and the center O using this conversion characteristic.

FIG. 9B is an example of non-linear conversion. In this non-linear conversion, as the specified point Pcc approaches the center O, the corresponding change in the position of the corresponding point Pt decreases in magnitude. Therefore, as the specified point Pcc approaches the center O, the changes in the color component intensity values Ic, Im, Iy representing three chromatic primary color inks occurring as a result of the change in the position of the specified point Pcc tend to become smaller. This type of non-linear conversion characteristic would be used because small differences in color tone are more conspicuous in the nearly achromatic (neutral-tone) region. In other words, with the characteristic shown in FIG. 9B, the color component intensity values Ic, Im, Iy experience small change when the position of the specified point Pcc is moved near the center O. As a result, regardless of the position in the ink color circle 110 of the specified point Pcc, the degree of perceptible change in color tone when the specified point Pcc is moved by any given distance can be maintained at an essentially uniform level.

When a point Pcc in the ink color circle 110 is specified, the tone determination module 56 (see FIG. 1) determines the position of the corresponding point Pt in the ink color triangle 112 corresponding to the specified point Pcc according to the mapping shown in FIGS. 8, 9A and 9B. It also determines the three color component intensity values Ic, Im, Iy based on the above equations (2a) through (2c) in accordance with the position of the corresponding point Pt. It further determines the respective tone adjustment values Cv, Mv, Yv in accordance with these three color component intensity values Ic, Im, Iy in accordance with FIG. 7A or 7B. The one-dimensional LUT generator 52 determines the ink amounts C', M', Y' based on the above equations (1a) through (1c) in accordance with these tone adjustment values Cv, Mv, Yv and creates a printing-use one-dimensional LUT 413.

When the specified point Pcc in the ink color circle 110 on the color tone setting window shown in FIG. 5 is specified, the user interface module 54 (see FIG. 1) displays a sample image to which is assigned the color tone determined in accordance with the position of the specified point Pcc in the sample image display area 120. Therefore, by reviewing the sample image, the user can determine whether or not the color tone is appropriate. If the color tone of the sample image is not appropriate, the specified point Pcc can be reset.

In the first embodiment described above, because the color tone is set using the color tone setting window 100 having the ink color circle 110, the user can easily set the color tone of the monochrome image. In particular, because the ink color circle 110 is constructed such that the color component intensities representing three chromatic primary color inks can be recognized visually based on the position in the ink color circle 110, the color tone of the monochrome image can be easily set. Furthermore, because any point in the ink color circle 110 is mapped to a corresponding position in the ink color triangle 112, the color component intensities Ic, Im, Iy representing the plural inks can be determined from the position of this corresponding point. In addition, a monochrome image printing-use one-dimensional LUT 413 can be easily created in accordance with the color component intensities Ic, Im, Iy representing the plural inks.

B. Second Embodiment

Figure 10A:
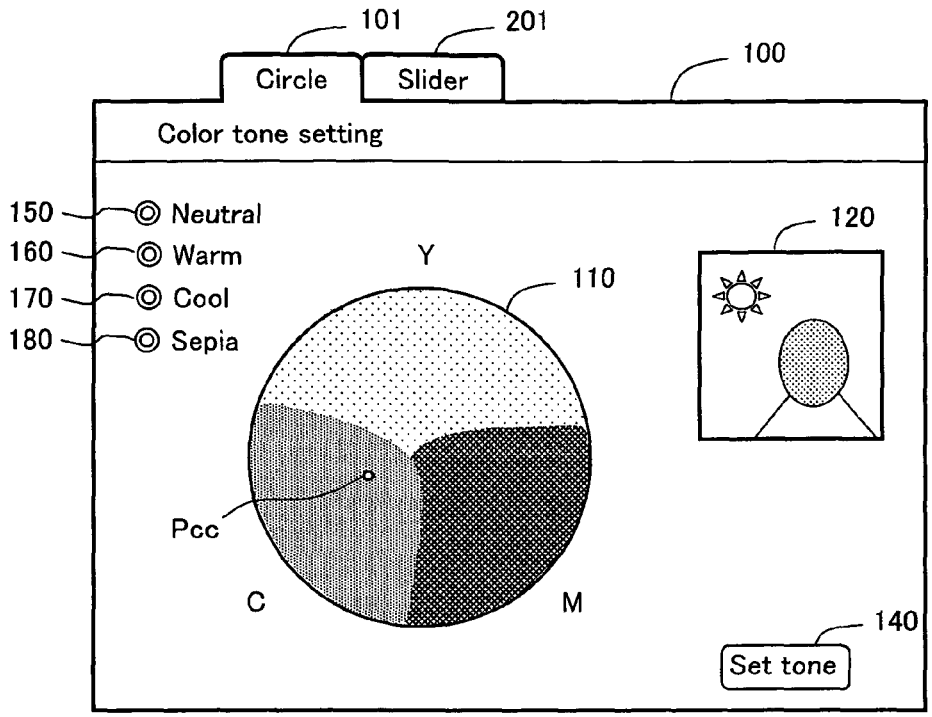
FIGS. 10A and 10B are explanatory drawings showing a color tone setting window in a second embodiment.
Figure 10B:
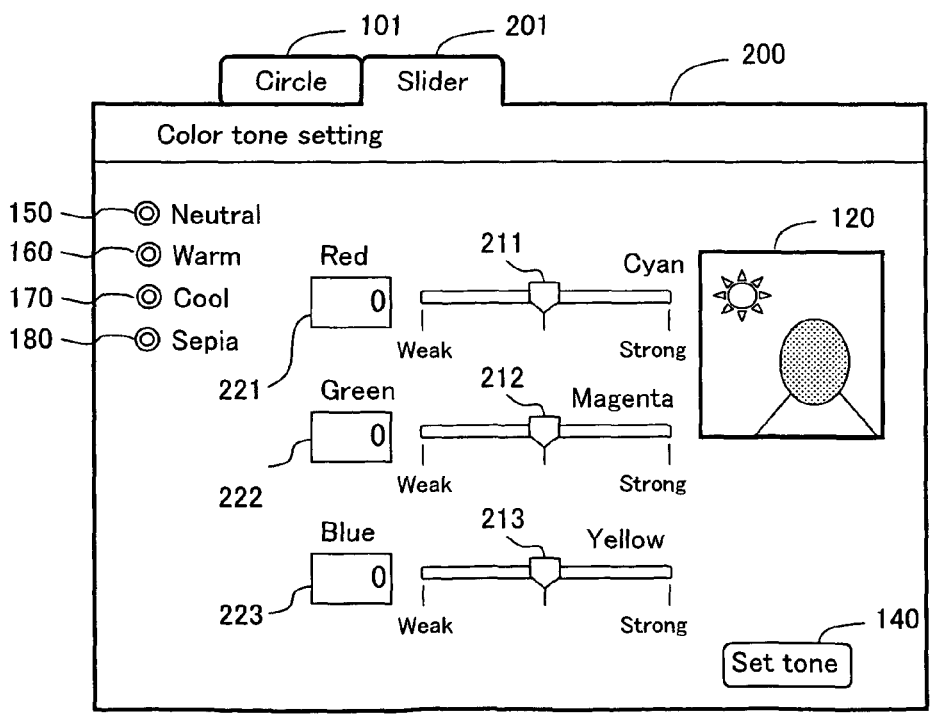

FIGS. 10A and 10B are explanatory drawings showing the color tone setting windows 100, 200 of a second embodiment. The color tone setting window 100 shown in FIG. 10A is virtually identical to that shown in FIG. 5, and differs only in that it includes tabs 101, 102 at the upper part of the window. When the user selects the first tab 101, the first color tone setting window 100 shown in FIG. 10A is displayed, while when the user selects the second tab 201, the second color tone setting window 200 shown in FIG. 10B is displayed.

The second color tone setting window 200 includes instead of the ink color circle 110 three ink color sliders 211-213, as well as a sample image display area 120, a tone determination button 140 and four reference tone setting buttons 150, 160, 170 and 180. The ink color sliders 211-213 are used by the user to set the intensity of each of the three ink color components of cyan, magenta and yellow. The value at the center of each slider corresponds to the neutral tone. Located to the left of the ink color sliders 211-213 are fields 221-223 that indicate the intensities of the RGB color components each comprising the complementary color of the corresponding ink color. For example, if the slider 211 used for cyan is set to a position having an intensity value higher than neutral (i.e., if it is positioned somewhat to the right of center), the intensity of the R component becomes a negative value. Conversely, if the cyan slider 211 is set to a position having an intensity lower than neutral (i.e., if it is positioned somewhat to the left of center), the intensity of the R component becomes a positive value. If the user selects any of the reference tone setting buttons 150, 160, 170, 180, the three sliders 211-213 are set to a position indicating the selected reference tone.

The color tone of the monochrome image is set in accordance with the positions of the three ink color sliders 211-213. Specifically, the chromatic ink amounts C', M', Y' are determined based on the equations (3a) through (3c) below, for example.

$$C' = C \times (Cu/C\text{max}) \quad (3a)$$

$$M' = M \times (Mu/M\text{max}) \quad (3b)$$

$$Y' = Y \times (Yu/Y\text{max}) \quad (3c)$$

Here, Cmax, Mmax, Ymax are the maximum values of the chromatic ink amounts C, M, Y in the reference one-dimensional LUT 412 (see FIG. 4), and Cu, Mu, Yu are the adjustment values for each ink color set using the ink color sliders 211-213. For example, the tone adjustment value Cu for the cyan component equals the maximum amount Cmax for cyan ink in the reference one-dimensional LUT 412 when the slider 211 is set in the center, while it becomes larger than the maximum value Cmax when the slider 211 is set to the right of center and smaller than the maximum value Cmax when the slider 211 is set to the left of center.

In this second color tone setting window 200, the three chromatic color components C, M, Y can be simultaneously increased in intensity or reduced in intensity. In this case, the ink amount for each color component in the reference one-dimensional LUT 412 is adjusted in accordance with the corresponding equation (3a) through (3c), and a monochrome printing-use one-dimensional LUT 413 is created. As can be understood from this explanation, using the sliders 211-213, the restriction in the ink color circle 110 which was present in the first embodiment, i.e., the rule that 'the sum of the three color component intensity values Ic, Im, Iy always equals 1', does not exist here, and the intensities or adjustment values of the three ink color components can be set independently. Therefore, use of the ink color sliders 211-213 offers the advantage of enabling color tone adjustment to be carried out over a wider range than is available when the ink color circle 110 is used. On the other hand, the ink color circle 110 offers the advantage of enabling the color tone of a monochrome image to be easily set by a non-expert because it enables the color tone to be set in a more visual fashion.

There is a possibility that ink duty limits would be exceeded when the color tone is set using the ink color sliders 211-213. The ink duty limit is a limit on the amount of ink discharged per unit of area. Ink duty limits generally include a limit on the ink discharge amount for each ink (primary color restriction) and a limit on the total amount of ink discharged. Where a color tone that would exceed one or more ink duty limits is set, the total ink discharge amount will be reduced to be at or below the limit amount by multiplying the three ink adjustment values Cu, Mu, Yu set using the sliders 211-213 by a single coefficient of less than 1.

Incidentally, in this embodiment, because the ink color circle 110 has the restriction that 'the sum of three color component intensity values Ic, Im, Iy always equals 1' and there is no similar restriction on the ink color sliders 211-213, switching between the two color tone setting windows 100, 200 is regulated by the existence of this restriction. Specifically, if the user clicks on the tab 201 in order to switch to the first color tone setting window 100 after performing tone adjustment using the second color tone setting window 200, the attempted switch is denied, and the second color tone setting window 200 remains onscreen. Alternatively, the operation sequence can be made such that when the user clicks on the tab 201, some sort of warning is displayed, such as a message stating, for example, that 'If you switch to the color circle now, the current tone settings will become invalid and will need to be reset,' and if the user clicks on the 'OK' button displayed on this warning display screen (not shown), the screen switches to the first color tone setting window 100 showing the initial tone setting state (such as neutral tone, for example).

If the user clicks on the tab 202 after tone adjustment is completed on the first color tone setting window 100, on the other hand, the screen switches to the second color tone setting window 200. In this case, the second color tone setting window 200 is displayed with the color tone set using the ink color circle 110 reflected on the ink color sliders 211-213.

As described above, in the second embodiment, because two different types of tone setting means, i.e. the ink color circle 110 and the ink color sliders 211-213, can be displayed on each color tone setting window, the color tone of the monochrome image can be set according to user preference using either of the two tone setting means. Furthermore, because the user switches between the two color tone setting windows 100, 200 and only one screen is shown at a time in the second embodiment, the screen is prevented from becoming unnecessarily complex and tone setting can be performed with only the window that the user finds easier to use being displayed. It is accordingly acceptable if the computer stores information regarding which of the two color tone setting windows 100, 200 was used and displays the same color tone setting window the next time tone setting is to be performed. The window or screen may also be constructed such that the two tone setting means, i.e., the ink color circle 110 and the ink color sliders 211-213, are displayed simultaneously on the same color tone setting window.

Alternatively, three color sliders used for setting the three RGB color component intensities may be used in place of the ink color sliders 211-213. However, the use of ink color sliders for the ink color components is preferable in that the monochrome image tone to be set can be visually recognized more easily.

C. Third Embodiment

Figure 11:
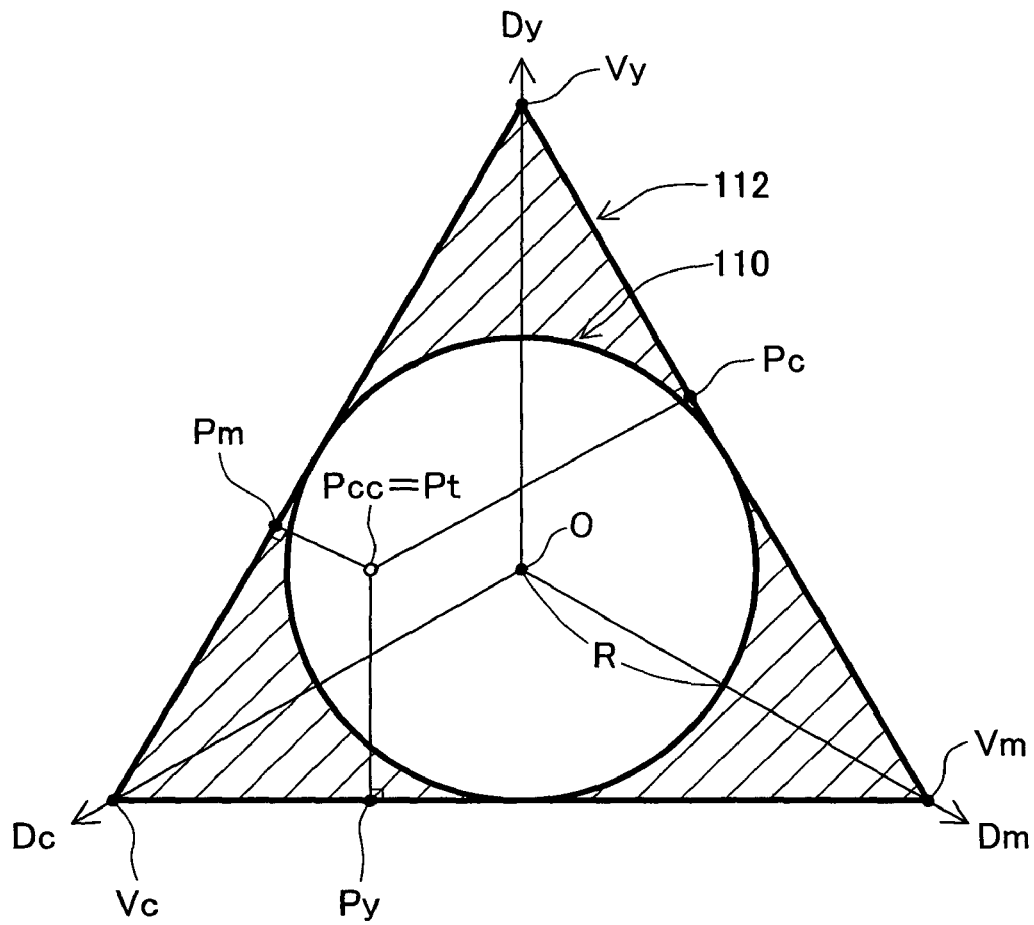
FIG. 11 is an explanatory drawing showing a method for determining the color component intensity values Ic, Im, Iy in a third embodiment.

FIG. 11 is an explanatory drawing showing a method for determining the color component intensity values Ic, Im, Iy representing chromatic primary color inks from a specified point Pcc in a third embodiment. This method differs from the method described with reference to FIG. 6 in the following two ways:

(Difference 1) The specified point Pcc in the ink color circle 110 is used as the corresponding point Pt as is.

(Difference 2) The method for calculating the three color component intensity values Ic, Im, Iy differs from the method described with reference to FIG. 6.

Difference 1 means that mapping from the ink color circle 110 to the ink color triangle 112 as described with reference to FIG. 8 is not performed. Therefore, in this embodiment, regions in the ink color triangle 112 that fall outside the ink color circle 110 (i.e., the regions shaded in the drawing) are not used.

Difference 2 is as follows: the color component intensity values Ic, Im, Iy representing three chromatic primary color inks for a given specified point Pcc(=Pt) in the ink color circle 110 are derived according to the following equations.

$$Ic=Qc/2R \tag{4a}$$

$$Im=Qm/2R \tag{4b}$$

$$Iy=Qy/2R \tag{4c}$$

Here, Qc, Qm and Qy are the lengths of the lines drawn perpendicularly to the sides opposite the vertexes for these colors from the point Pcc(=Pt), and R is the radius of the ink color circle 110.

The values for Qc, Qm and Qy fall within the range 0-2R. Therefore, the three color component intensity values Ic, Im, Iy fall within the range 0-1. Furthermore, the sum of the three color component intensity values Ic, Im, Iy does not equal 1, unlike in the first embodiment (equations (2a)-(2c)). If the specified point Pcc(=Pt) is located at the center O of the circle, Ic=Im=Iy=0.5. Because the values of the three color component intensity values Ic, Im, Iy are equal at the center O, the center O corresponds to achromaticity (neutral tone). At a position above the center O close to the vertex Vy, the color component intensity value for yellow increases. Similarly, at a position to the left of the center O close to the vertex Vc, the color component intensity value for cyan increases, and at a position to the right of the center O close to the vertex Vm, the color component intensity value for magenta increases. Therefore, as in the first embodiment, the intensities of the three color components can be visually recognized from the position of the specified point Pcc in the ink color circle 110.

Figure 12A:
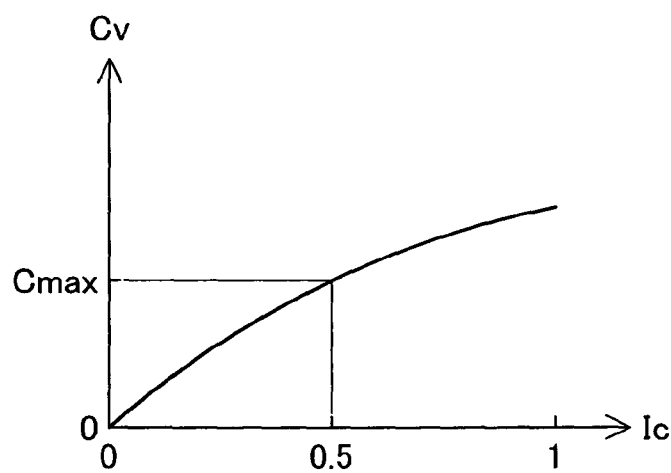
FIGS. 12A through 12C are graphs showing the relationship between the color component intensity value and the tone adjustment value in the third embodiment.
Figure 12B:
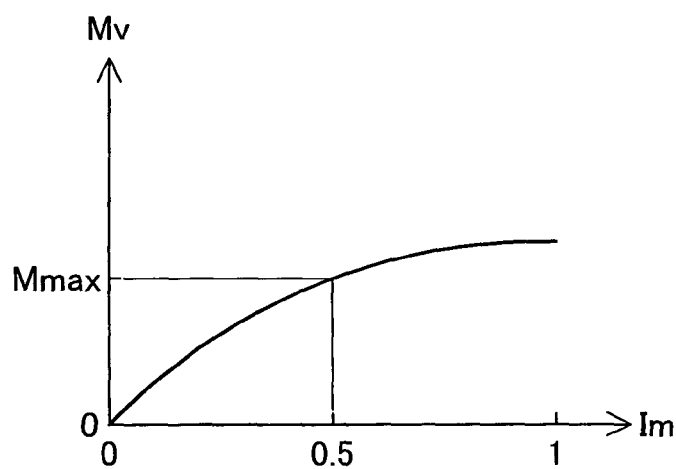
Figure 12C:
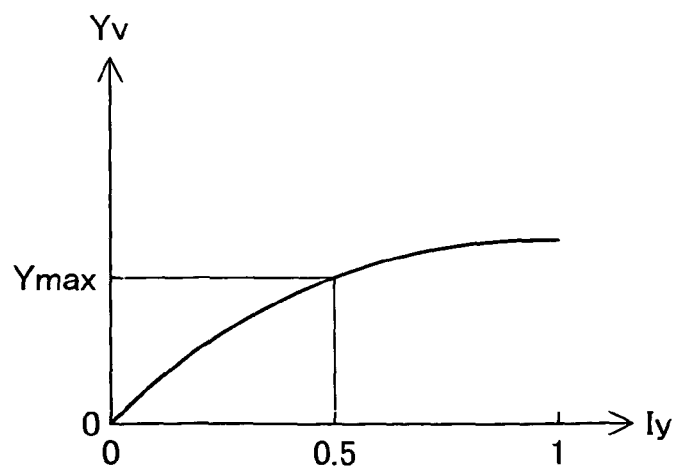

FIGS. 12A through 12C respectively show the relationships between the three color component intensity values Ic, Im, Iy and the tone adjustment values Cv, Mv, Yv in the third embodiment. In this embodiment, the relationships between the color component intensity value and the tone adjustment value are set independently for each color component and stored in table format. The tone adjustment values Cv, Mv, Yv are set such that they monotonically increase with the three color component intensity values Ic, Im, Iy. Furthermore, the tone adjustment values Cv, Mv, Yv are set to values equal to the maximum ink amount values Cmax, Mmax, Ymax in the reference one-dimensional LUT 312 when the color component intensity values Ic, Im, Iy all equal 0.5. In this way, where the three color component intensity values Ic, Im, Iy all equal 0.5, a neutral-tone monochrome image will be reproduced. The color component intensity values and tone adjustment values may have a linear relationship or various types of non-linear (curved) relationships. Furthermore, in this embodiment, the color component intensity value/tone adjustment value relationship has different characteristics for each of the three color components, but the same characteristic may be used for all three color components. If the three color component intensity values all have different characteristics, however, the relationship between the position of the specified point Pcc and the color tone of the monochrome image can be set more flexibly and to a color tone closer to the desired one.

As described above, the tone adjustment values Cv, Mv, Yv are uniquely determined in accordance with the position of any specified point Pcc in the ink color circle 110 in the third embodiment as well. The ink amounts C', M', Y' in the printing-use one-dimensional LUT 413 (see FIG. 3D) are calculated based on the above equations (1a)-(1c) using these tone adjustment values Cv, Mv, Yv. Therefore, in the third embodiment as well, the user can easily set the color tone of a monochrome image using the ink color circle 110.

In the third embodiment, as well as in the first embodiment described above, the tone adjustment values Cv, Mv, Yv are uniquely determined from the position of a specified point Pcc in the ink color circle 110. Therefore, if (i) the method to calculate the color component intensity values Ic, Im, Iy, (ii) the relationships between the color component intensity values Ic, Im, Iy and the tone adjustment values Cv, Mv, Yv, and (iii) the method to carry out mapping from the ink color circle 110 to the ink color triangle 112 (in the case of the first embodiment) are each set appropriately, the same tone adjustment (i.e., the relationship between the position of the specified point Pcc and the color tone of the monochrome image) can be realized in both the first and third embodiments. However, in the third embodiment, because the mapping indicated in the item (iii) above is unnecessary and the relationships shown in FIGS. 12A-12C can be set appropriately in advance, the relationship between the position of the specified point Pcc and the color tone of the monochrome image can be set more easily.

It is preferred that the relationship between the position of the specified point Pcc in the ink color circle 110 and the tone adjustment values Cv, Mv, Yv is changed in accordance with the type of printing medium used for printing. Specifically, the printer driver 41 (see FIG. 1) can be constructed such that the relationships shown in FIGS. 12A-12C are preset for different types of printing medium and the appropriate set of relationships is selected based on the type of printing medium used. The reason for this is that because the color reproduction characteristics of inks vary depending on the printing medium, the ink amounts needed to reproduce the desired color tone varies. Normally, reference one-dimensional LUTs 412 appropriate for various types of printing media are also preset.

D. Fourth Embodiment

In the fourth embodiment, a technology is described that displays on the CRT 22 a monochrome image to which a prescribed color tone is assigned based on a one-dimensional LUT used to reproduce monochrome images having that color tone. Specifically, a process is described in which RGB signals are sought from the ink amounts in order to display on the CRT 22 a prescribed color tone to be reproduced via printing. This process can be used when a monochrome sample image is to be displayed in the sample image display area 120 (see FIG. 5).

Figure 13:
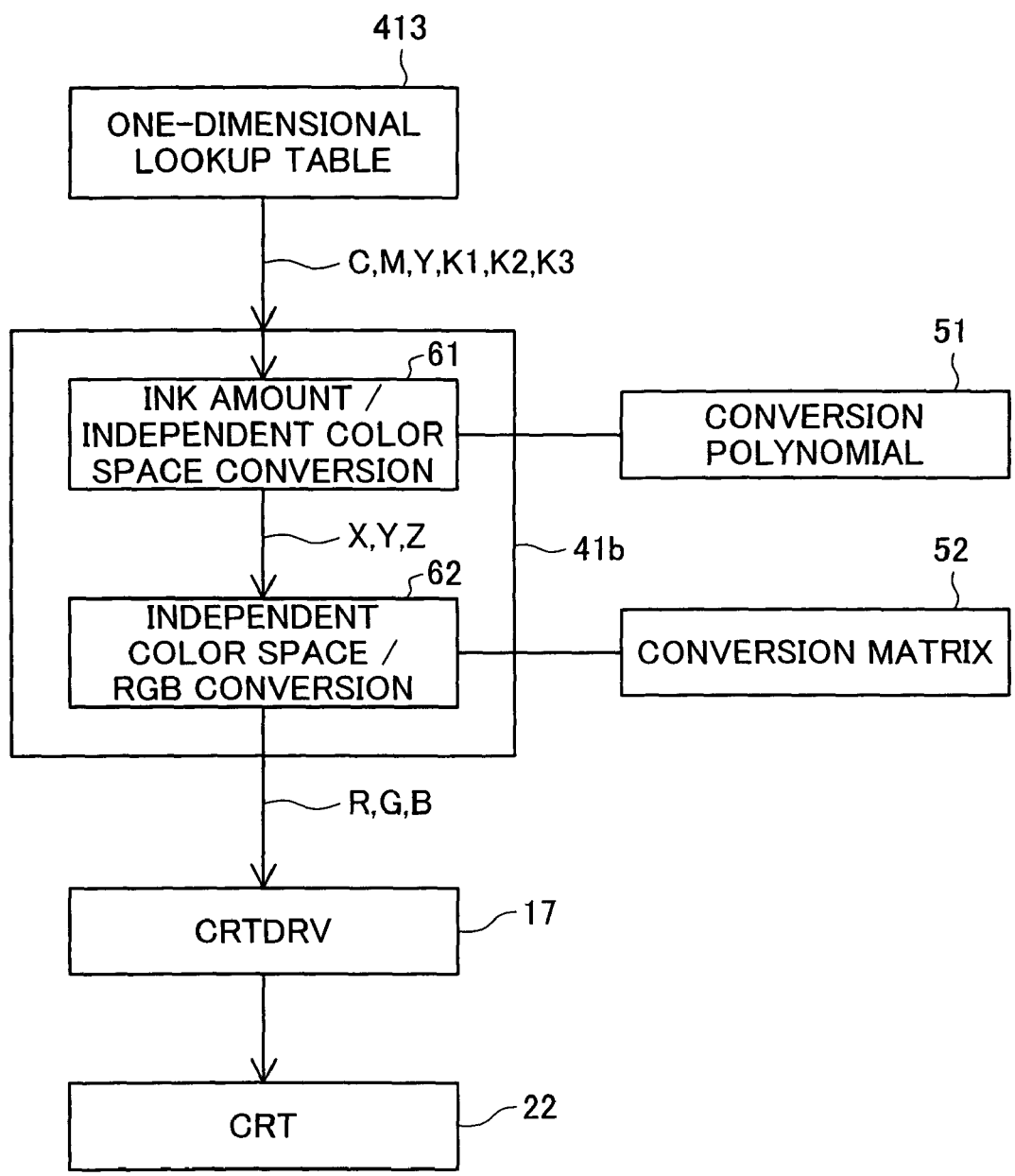
FIG. 13 is a block diagram showing the operations of signal processing to display a monochrome image on a display device.

FIG. 13 is a block diagram showing the signal processing of the fourth embodiment. The color conversion module 41b implements two conversion functions expressed as blocks for the sake of convenience. One is an ink amount/independent color space conversion function 61 that performs conversion to a device-independent color space from the ink amounts, and the other is an independent color space/RGB conversion function 62 that performs conversion from the device-independent color space to RGB signals.

The respective ink amounts C, M, Y, K1, K2, K3 are supplied to the color conversion module 41b from the one-dimensional LUT 413 created by the one-dimensional LUT generator 52 (see FIG. 1).

At the same time, the conversion polynomial 51 stored in the printer driver 41 associates the ink amounts for the inks used by the printer and a device-independent color space. The ink amount/independent color space conversion function 61 seeks the coordinates in a color space independent from the device, such as the XYZ color space, based on the conversion polynomial 51 and the ink amounts C, M, Y, K1, K2, K3. In FIG. 13, X, Y, and Z are used as symbols denoting these coordinates.

The conversion matrix 52 associates the RGB signals used by the monitor with the device-independent color space, and is stored in the printer driver 41. The independent color space/RGB conversion function 62 seeks RGB signals suitable for the CRT 22 serving as the monitor based on the conversion matrix 52 and the coordinates in the XYZ color space.

The RGB signals sought in this fashion are supplied to the CRT 22 from the color conversion module 41b via the CRT printer driver 17. Therefore, a monochrome image to which the color tone set in step T12 shown in FIG. 2 is assigned can be displayed on the CRT 22.

E. Variations

The present invention is not limited to the embodiments and examples described above, and may be realized in various forms within the essential scope thereof. The following variations are possible, for example.

E1. Variation 1

Figure 22:
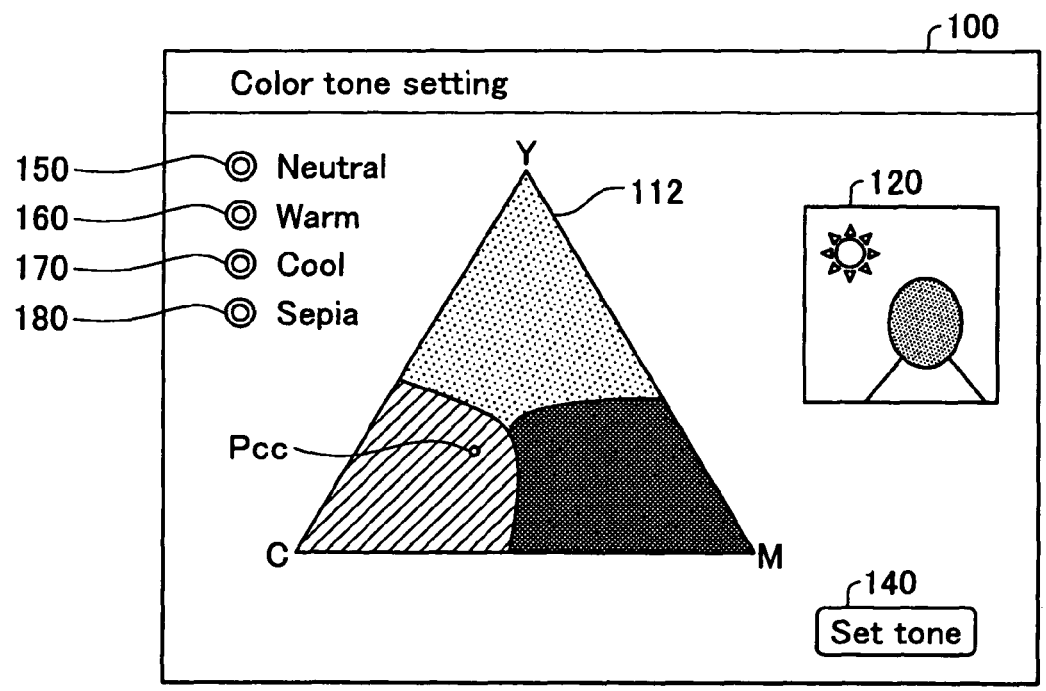
FIG. 22 is an explanatory drawing showing a color tone setting window 100 in an expanded fashion in accordance with an alternative embodiment.

In the example shown in FIG. 5, the ink color circle 110 is displayed in the color tone setting window 100, but the ink color triangle 112 (see FIG. 6) may be displayed in the color tone setting window instead of the ink color circle 110. FIG. 22 shows the color tone setting window 100 with the ink color triangle 112 displayed in the color tone setting window. Displaying the ink color triangle 112 offers the advantage that the mapping described in connection with the first embodiment (see FIGS. 8, 9A and 9B) need not be carried out. On the other hand, the ink color circle 110 has an advantage that the relationship between the point in the ink color circle 110 and the color tone can be grasped in a more visual fashion than the relationship between the point in the ink color triangle 112 and the color tone.

E2. Variation 2

In the above embodiments, the three ink colors of C, M and Y are used as chromatic inks, but other chromatic inks may be used, or inks of the same colors but of different concentrations may be used. Furthermore, the present invention may be applied where at least one chromatic ink can be used to print a monochrome image. However, it is preferred that two or more chromatic inks be available for color tone setting, as this increases the freedom in color tone setting, and the ability to use three or more chromatic inks during color tone setting is particularly preferred. It is additionally preferred that at least one type of ink be available for use as an achromatic ink.

Figure 14A:
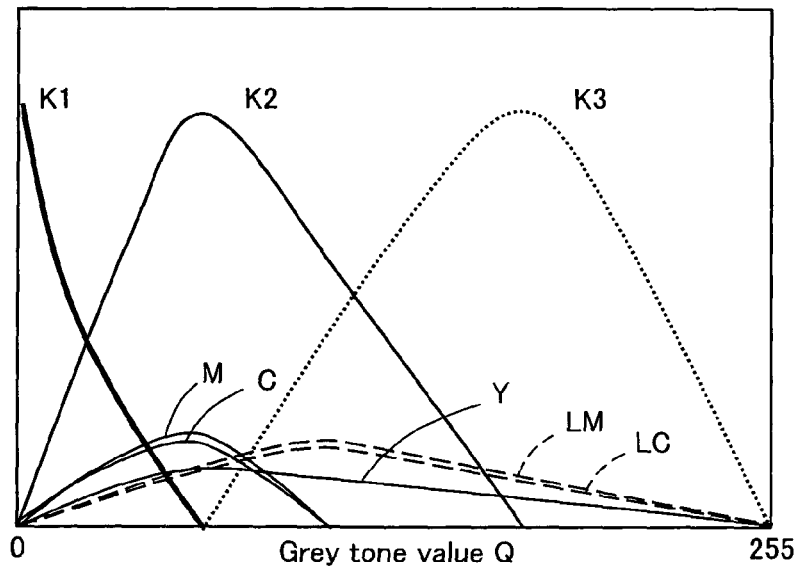
FIGS. 14A and 14B are explanatory drawings showing an example of a method to create a printing-use one-dimensional LUT where light cyan ink LC and light magenta ink LM are used.
Figure 14A:
Figure 14B:
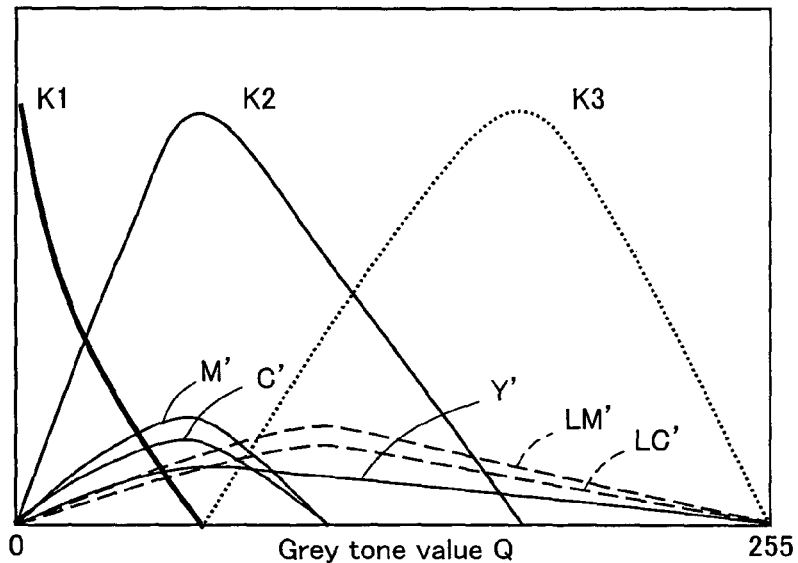

FIGS. 14A and 14B are explanatory drawings showing an example of a method to create a printing-use one-dimensional LUT where light cyan ink LC and light magenta ink LM are used in addition to the six inks used in the above embodiments (K1-K3, C, M, Y). The reference one-dimensional LUT 412a shown in FIG. 14A incorporates eight types of ink as output inks (K1-K3, C, LC, M, LM, Y). FIG. 14B is an example of a monochrome image printing-use one-dimensional LUT 413a.

The amounts of chromatic ink calculated using the printing-use LUT 413a are obtained via the following equations.

$$C' = C \times (Cv/C\text{max}) \tag{5a}$$

$$LC' = LC \times (Cv/C\text{max}) \tag{5b}$$

$$M' = M \times (Mv/M\text{max}) \tag{5c}$$

$$LM' = LM \times (Mv/M\text{max}) \tag{5d}$$

$$Y' = Y \times (Yv/Y\text{max}) \tag{5e}$$

As can be seen from the above equations, the ink amount C' of normal cyan ink and the ink amount LC' of light cyan ink are adjusted using the same adjustment coefficient Cv/Cmax. Similarly, the ink amount M' of normal magenta ink and the ink amount LM' of light magenta ink are adjusted using the same adjustment coefficient Mv/Mmax. Therefore, the ink amounts for the lighter inks LC and LM can be determined using the coefficients Cv/Cmax and Mv/Mmax determined in connection with the embodiments described above as is.

Figure 15A:
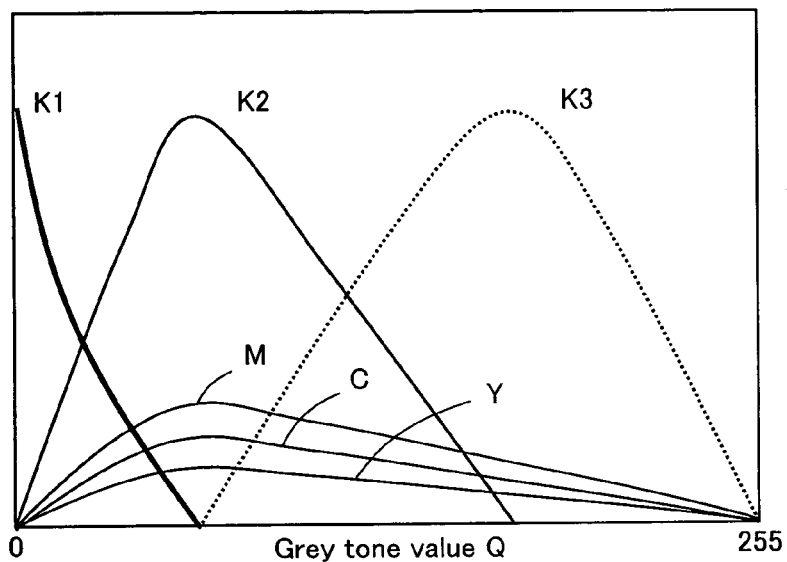
FIGS. 15A and 15B are explanatory drawings showing a different example of a method to create a printing-use one-dimensional LUT where light cyan ink LC and light magenta ink LM are used.
Figure 15A:
Figure 15B:
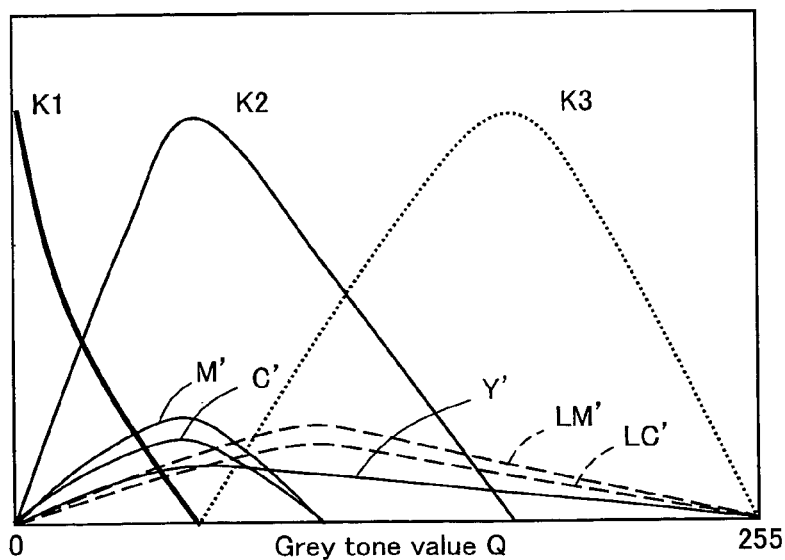
Figure 16:
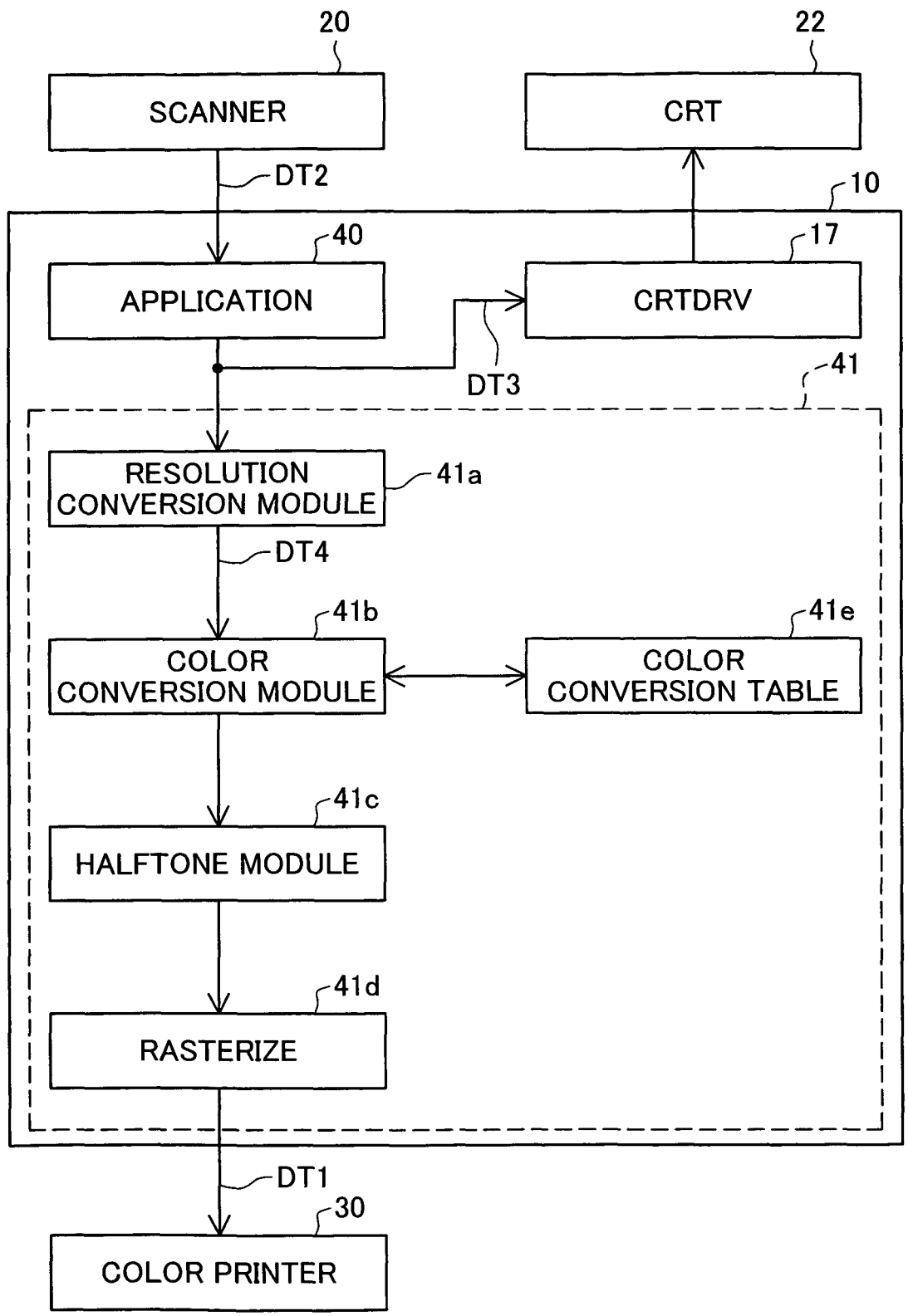
FIG. 16 is a block diagram showing the conventional technology in a conceptual fashion.
Figure 17:
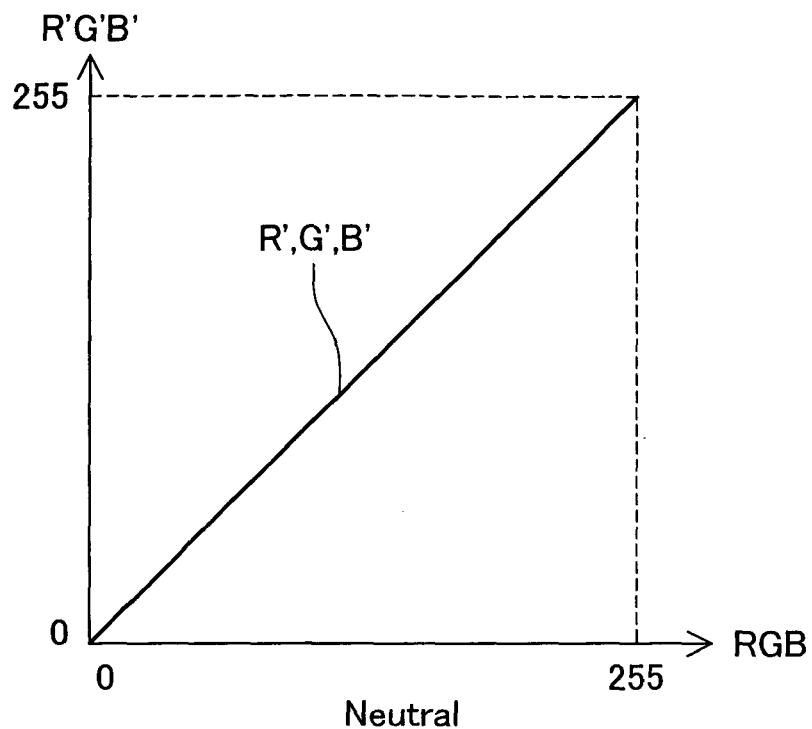
FIG. 17 is a graph showing the conversion of RGB signals during color tone assignment processing.
Figure 18:
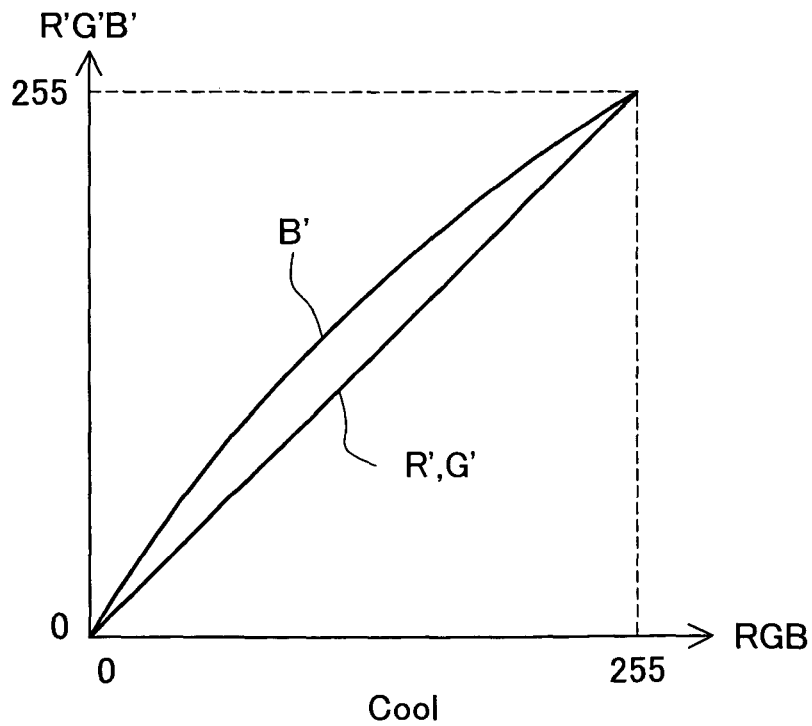
FIG. 18 is a graph showing the conversion of RGB signals during color tone assignment processing.
Figure 19:
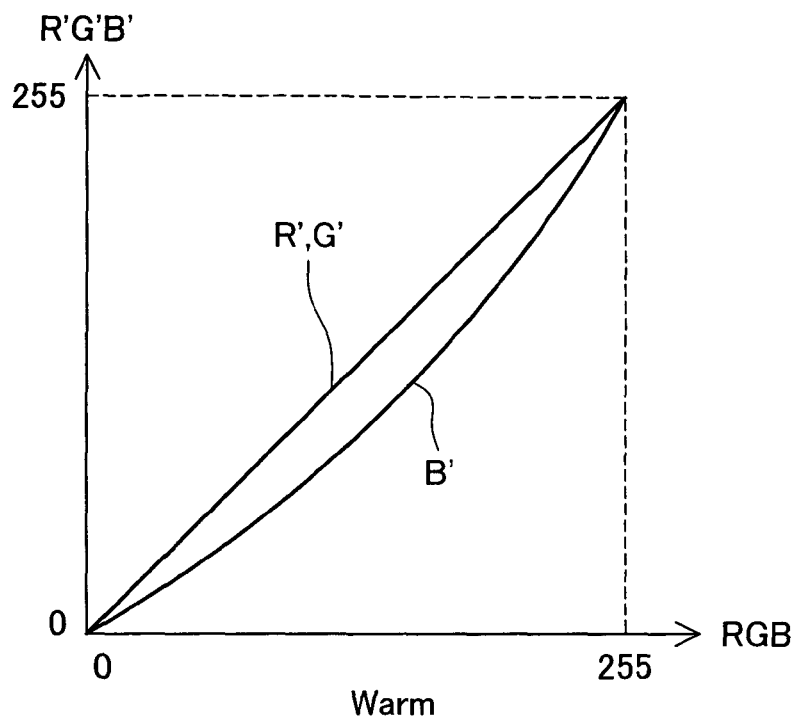
FIG. 19 is a graph showing the conversion of RGB signals during color tone assignment processing.
Figure 20:
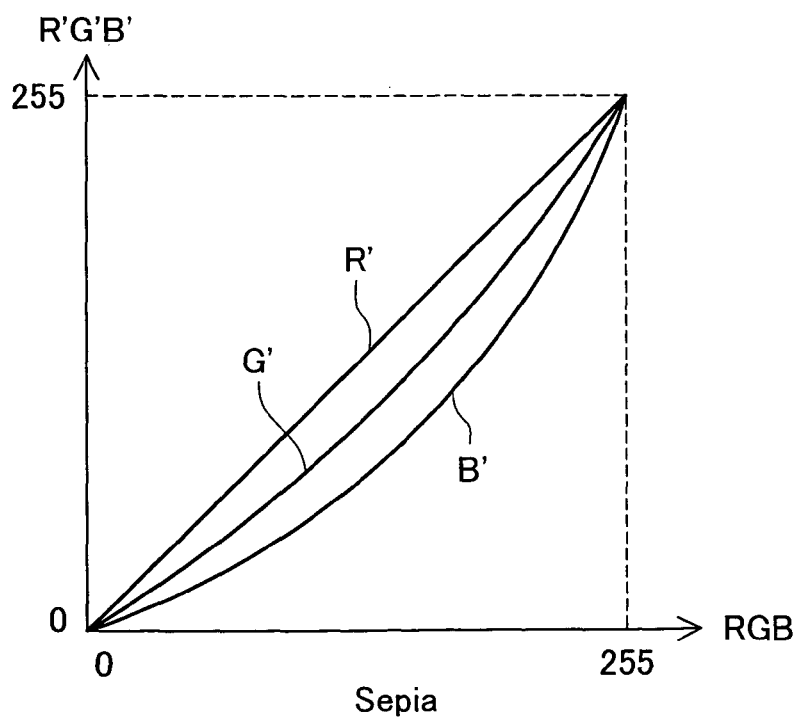
FIG. 20 is a graph showing the conversion of RGB signals during color tone assignment processing.
Figure 21:
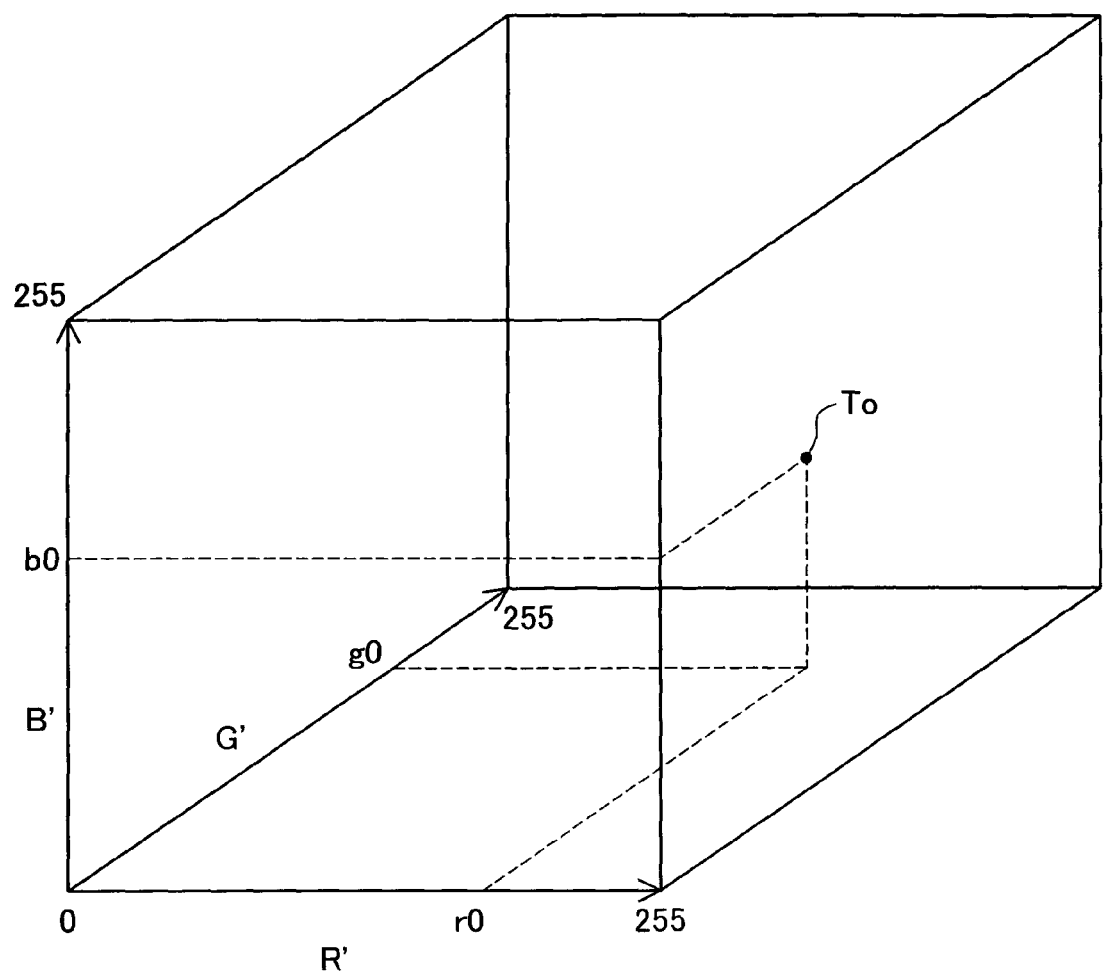
FIG. 21 is a graph to explain a technology to set ink amounts using a color conversion table.

FIGS. 15A and 15B are explanatory drawings showing a different example of a method to create a printing-use one-dimensional LUT where light cyan ink LC and light magenta ink LM are used. The reference one-dimensional LUT 412 shown in FIG. 15A incorporates the six types of ink as output inks (K1-K3, C, M, Y), and does not include light inks, as in FIG. 3C. FIG. 15B is an example of a monochrome printing-use one-dimensional LUT 413a.

Here, amounts of chromatic inks calculated using the printing-use LUT 413a are obtained via the following equations.

$$C' = \alpha C \times (Cv/C\text{max}) \tag{6a}$$

$$LC' = k1(1-\alpha)LC \times (Cv/C\text{max}) \tag{6b}$$

$$M' = \beta M \times (Mv/M\text{max}) \tag{6c}$$

$$LM' = k2(1-\beta)M \times (Mv/M\text{max}) \tag{6d}$$

$$Y' = Y \times (Yv/Y\text{max}) \tag{6e}$$

Here, $\alpha$, $\beta$, k1 and k2 are coefficients.

The ink amount C' for normal cyan ink is obtained by multiplying the original normal cyan ink amount C by the coefficient $\alpha$ and the adjustment coefficient Cv/Cmax. The coefficient $\alpha$ is less than 1. It is preferred that the coefficient $\alpha$ be set such that it changes in accordance with the magnitude of the grey tone value Q. The light cyan ink amount LC' is obtained by multiplying the original light cyan ink amount LC by the coefficient (1−$\alpha$), the adjustment coefficient Cv/Cmax, and the additional coefficient k1. This coefficient k1 is a ratio between the light ink amount and normal ink amount that provides the same print density, and is larger than 1 (such as between 3 and 4, for example). The magenta ink amounts M' and LM' are calculated in a similar fashion using the coefficients $\beta$ and k2. Values that change in accordance with the ink amount C may be set in advance for the cyan coefficients $\alpha$ and k1 as well as for the magenta coefficients $\beta$ and k2.

As can be seen from these examples, even where multiple types of ink having different concentrations (termed 'normal' and 'light' inks here) are used for one or more chromatic color components, the intensity value and tone adjustment amount need not be determined for each individual ink, and it is sufficient if the intensity value and tone adjustment amount are determined for each color component.

INDUSTRIAL APPLICABILITY

The present invention is applicable to a computer that is caused to output images to a printer, and it is also applicable to a printer itself.

The invention claimed is:

1. A method for setting a color tone of a monochrome image, comprising the steps of:
   (a) displaying a color tone setting window, using a graphical user interface module, for use in setting a color tone of a monochrome image, the color tone setting window including an ink color circle for specifying color component intensities representing three chromatic primary color inks with a single specified point therein; and
   (b) determining the color component intensities representing the three chromatic primary color inks as parameters defining the color tone of the monochrome image in accordance with the position of a point specified in the ink color circle using a color tone determination module, wherein
   the ink color circle is configured to enable the color component intensities representing the three chromatic primary color inks to be visually recognized from the position in the ink color circle,
   an arbitrary point in the ink color circle is mapped to a corresponding point in an ink color triangle which is a hypothetical equilateral triangle corresponding to the ink color circle, the ink color triangle is an equilateral triangle having a common center with the ink color circle such that the color component intensities representing the three chromatic primary color inks at the corresponding point are determined in accordance with lengths of three lines drawn perpendicularly to three sides of the ink color triangle respectively from the corresponding point,
   three vertices of the ink color triangle correspond to three chromatic primary colors of cyan, magenta, and yellow,
   the ink color triangle circumscribes the ink color circle,
   an arbitrary point in the ink color circle is mapped to a corresponding point in an inscribed circle of the ink color triangle, and
   the corresponding point in the ink color triangle corresponding to an arbitrary point in the ink color circle is mapped such that the corresponding point is present on a straight line connecting the center of the ink color circle and the arbitrary point.

2. A method according to claim 1, wherein the three chromatic primary color inks are cyan ink, magenta ink and yellow ink, which constitute output of a one-dimensional lookup table that is used for color conversion during printing of a monochrome image to obtain output of ink amounts for the plural ink colors in response to input of a lightness tone value of an image.

3. A method according to claim 1, wherein a corresponding point in the ink color triangle corresponding to an arbitrary point on outer circumference of the ink color circle is mapped such that the corresponding point is present on a side of the ink color triangle.

4. A method according to claim 3, wherein the center of the ink color circle expresses an achromatic color, and
the mapping has a non-linear conversion characteristic wherein change in the color component intensities representing the three chromatic primary color inks corresponding to change in position of a point decreases as the point becomes closer to the center of the ink color circle.

5. A method according to claim 1, wherein the color tone setting window further includes a sample image display area for displaying a monochrome sample image, and
the step (b) includes a step of adjusting the color tone of the monochrome sample image based on the color component intensities representing the three chromatic primary color inks that are set using the ink color circle.

6. A method according to claim 1, wherein the color tone setting window is able to display the ink color circle and color sliders.

7. A method according to claim 6, wherein the color sliders include three ink color sliders used to set the color component intensities representing the three chromatic primary color inks.

8. A method according to claim 6, wherein the color tone setting window includes a first window that has the ink color circle and a second window that has the color sliders such that the first and second windows are switched to be selectively displayed according to user selection.

9. A method according to claim 8, wherein when the first window is switched to the second window according to user selection, the color tone specified via a specified point in the ink color circle is reflected and displayed on the color sliders.

10. A method according to claim 9, wherein when the user instructs that the second window be switched to the first window, switching to the first window is prohibited and display of the second screen is maintained, or a warning display is issued indicating that the attempted switch to the first window is invalid.

11. A method according to claim 6, wherein the color tone setting window has buttons to set multiple basic color tones, such that when a user selects one basic color tone, the specified point in the ink color circle and slider positions of the color sliders are displayed at a position indicating the selected basic tone.

12. A method according to claim 1, further comprising the steps of:
(c) providing a reference one-dimensional lookup table that inputs an image lightness tone value and outputs ink amounts for plural types of ink including multiple chromatic inks; and
(d) generating a printing-use one-dimensional lookup table for use in printing of a monochrome image by adjusting amounts of the multiple chromatic inks in the reference one-dimensional lookup table in accordance with the color component intensities representing the three chromatic primary color inks determined in the step (b).

13. A method according to claim 12, wherein multiple inks having different concentrations of identical color component are usable, and ink amounts of the multiple different-concentration inks are adjusted using an identical color component intensity value.

14. A method according to claim 1, further comprising the steps of:
determining an ink amount adjustment value for each color component based on the intensity value for each color component; and
adjusting an ink amount for each color component using the ink amount adjustment value for each color component,
wherein relationship between the intensity value of each color component and the ink amount adjustment value for each color component is established independently for each color component.

15. An apparatus for setting a color tone of a monochrome image, comprising:
a user interface module configured to display a color tone setting window for use in setting a color tone of a monochrome image, the color tone setting window including an ink color circle or an ink color triangle for specifying color component intensities representing three chromatic primary color inks with a single specified point; and
a color tone determining module configure to determining the color component intensities representing the three chromatic primary color inks as parameters defining the color tone of the monochrome image in accordance with the position of a point specified in the ink color circle or the ink color triangle, wherein
the ink color circle or the ink color triangle is configured to enable the color component intensities representing the three chromatic primary color inks to be visually recognized from the position in the ink color circle or the ink color triangle,
three vertices of the ink color triangle correspond to three chromatic primary colors of cyan, magenta, and yellow,
in a case where the color tone window includes the ink color circle, an arbitrary point in the ink color circle is mapped to a corresponding point in the ink color triangle which is a hypothetical equilateral triangle corresponding to the ink color circle,
the ink color triangle is an equilateral triangle having a common center with the ink color circle such that the color component intensities representing the three chromatic primary color inks at the corresponding point are determined in accordance with lengths of three lines drawn perpendicularly to three sides of the ink color triangle respectively from the corresponding point,
the ink color triangle circumscribes the ink color circle,
an arbitrary point in the ink color circle is mapped to a corresponding point in an inscribed circle of the ink color triangle, and
the corresponding point in the ink color triangle corresponding to an arbitrary point in the ink color circle is mapped such that the corresponding point is present on a straight line connecting the center of the ink color circle and the arbitrary point.

16. A computer program stored on a non-transitory computer readable storage medium for use in setting a color tone of a monochrome image to be printed, the program causing a computer to realize the functions of:
displaying a color tone setting window for use in setting a color tone of a monochrome image, the color tone setting window including an ink color circle or an ink color triangle for specifying color component intensities representing three chromatic primary color inks with a single specified point; and
determining the color component intensities representing the three chromatic primary color inks as parameters defining the color tone of the monochrome image in accordance with the position of a point specified in the ink color circle or the ink color triangle, wherein the ink color circle or the ink color triangle is configured to enable the color component intensities representing the three chromatic primary color inks to be visually recognized from the position in the ink color circle or the ink color triangle, three vertices of the ink color triangle correspond to three chromatic primary colors of cyan, magenta, and yellow, in a case where the color tone window includes the ink color circle, an arbitrary point in the ink color circle is mapped to a corresponding point in the ink color triangle which is a hypothetical equilateral triangle corresponding to the ink color circle, the ink color triangle is an equilateral triangle having a common center with the ink color circle such that the color component intensities representing the three chromatic primary color inks at the corresponding point are determined in accordance with lengths of three lines drawn perpendicularly to three sides of the ink color triangle respectively from the corresponding point, the ink color triangle circumscribes the ink color circle, an arbitrary point in the ink color circle is mapped to a corresponding point in an inscribed circle of the ink color triangle, and the corresponding point in the ink color triangle corresponding to an arbitrary point in the ink color circle is mapped such that the corresponding point is present on a straight line connecting the center of the ink color circle and the arbitrary point.

* * * * *